United States Patent [19]

Kogane et al.

[11] Patent Number: 4,688,737
[45] Date of Patent: Aug. 25, 1987

[54] APPARATUS FOR AUTOMATICALLY WINDING UP PHOTOGRAPHIC PAPER

[75] Inventors: Mikio Kogane, Kanagawa; Teruo Shibazaki, Saitama, both of Japan

[73] Assignee: Fuji Photo Film Co., Ltd., Kanagawa, Japan

[21] Appl. No.: 791,482

[22] Filed: Oct. 25, 1985

[30] Foreign Application Priority Data

Oct. 25, 1984 [JP] Japan ................. 59-224335

[51] Int. Cl.⁴ .................. G03B 27/00; B65H 18/08
[52] U.S. Cl. .................. 242/67.1 R; 242/71.1; 242/74
[58] Field of Search ............ 242/67.1 R, 71.1, 74, 242/71, 76

[56] References Cited

U.S. PATENT DOCUMENTS

| 3,395,870 | 8/1968 | Klinger | 242/76 X |
| 3,585,779 | 6/1971 | Thayer | 242/67.1 R X |
| 3,740,001 | 6/1973 | Wroblewski | 242/74 X |
| 4,111,379 | 9/1978 | Luscher | 242/71.1 |
| 4,544,110 | 10/1985 | Nagel et al. | 242/67.1 R |

Primary Examiner—Stuart S. Levy
Assistant Examiner—David Werner
Attorney, Agent, or Firm—Sughrue, Mion, Zinn, Macpeak, and Seas

[57] ABSTRACT

An apparatus for automatically winding up a photographic paper that has been photographically processed onto a take-up spool is arranged such that the leading end portion of the photographic paper is passed through the area between a pair of guide plates so as to be guided to the outer periphery of the take-up spool and is then wound up onto the spool while being pressed against the outer periphery of the spool by means of rollers respectively mounted on a pair of guide arms. These guide arms expand or separate from each other in accordance with increase in the diameter of the roll of photographic paper being wound up onto the spool.

7 Claims, 20 Drawing Figures

F I G. 19
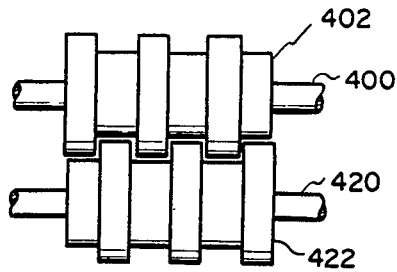

APPARATUS FOR AUTOMATICALLY WINDING UP PHOTOGRAPHIC PAPER

BACKGROUND OF THE INVENTION

1. Field of the Invention

The present invention relates to an apparatus for automatically winding up a photographic paper that has been subjected to printing or other photographic processes onto a spool.

2. Description of the Related Art

A photographic printer which employs a continuous photographic paper needs to wind up a printed photographic paper onto a spool.

When a printed photographic paper is wound up onto a spool, it is conventional practice to wind up the leading end portion of the photographic paper onto the outer periphery of the spool by a manual operation and then to rotate the spool so as to wind up the paper thereonto. For this reason, even when the other sections of the printer are automated, or a printing operation is effected at high speed, the overall operating efficiency of the printer cannot be satisfactorily increased due to the manual operation required to wind up the photographic paper onto the spool.

SUMMARY OF THE INVENTION

In view of the above-described circumstances, it is a primary object of the present invention to provide an apparatus which enables a photographic paper than has been photographically processed to be automatically wound up onto a spool.

To this end, the present invention provides an apparatus for automatically winding up photographic paper which comprises: a spool; a pair of guide plates disposed so as to face the obverse and reverse surfaces respectively of a photographic paper, for guiding the leading end portion of the photographic paper to the outer periphery of the spool; a pair of guide arms to which these guide plates are respectively secured and which expand or separate from each other in accordance with increase in the diameter of the roll of photographic paper being wound up onto the spool; and rollers respectively mounted on these guide arms so as to press the photographic paper on the outer periphery of the spool.

By virtue of the above-described arrangement, the leading end portion of the photographic paper that has been photographically processed reaches the outer periphery of the spool while being guided by the pair of guide plates, and is automatically wound up on the outer periphery of the spool while being pressed by the rollers of the guide arms.

As described above, the apparatus according to the present invention has a spool, a pair of guide plates for guiding the leading end portion of a photographic paper to the spool, a pair of guide arms to which the guide plates are respectively secured and which can expand or separate from each other, and rollers respectively mounted on the guide arms so as to press the photographic paper on the outer periphery of the spool. It is therefore advantageously possible for the leading end portion of a photographic paper that has been photographically processed to be automatically wound up onto the outer periphery of the spool.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIG. 19 is a sectional view taken along the line XIX—XIX of FIG. 14; and

DESCRIPTION OF THE PREFERRED EMBODIMENT

Figure 1:
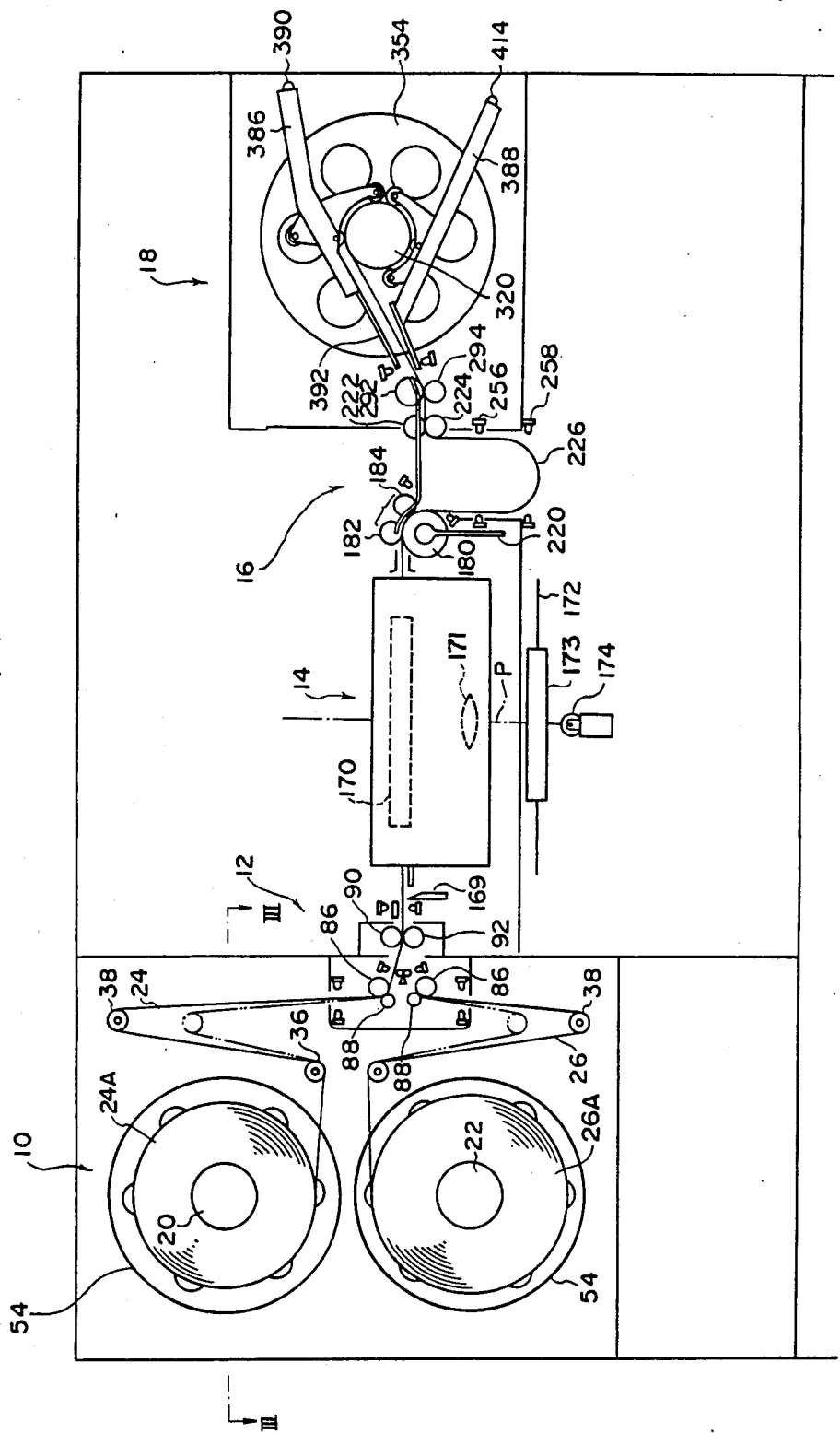
FIG. 1 is a front elevational view of a photographic printer to which one embodiment of the apparatus for automatically winding up photographic paper according to the present invention is applied.
Figure 2:
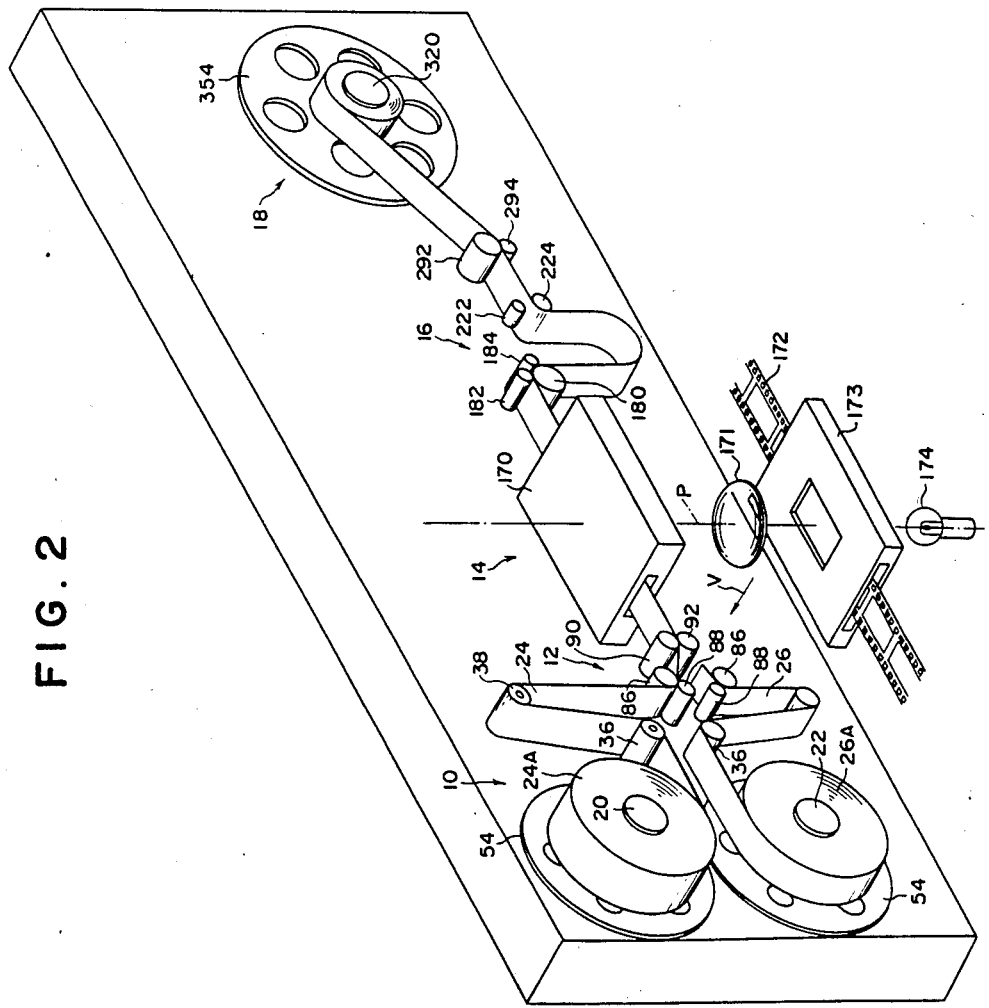
FIG. 2 is a perspective view of an essential part of the printer shown in FIG. 1.

Referring first to FIGS. 1 and 2, a photographic printer has a supply spool section 10, a front guide section 12, a printing section 14, a rear guide section 16, and a take-up spool section 18 to which one embodiment of the apparatus for automatically winding up photographic paper according to the present invention is applied. Photographic papers 24 and 26 which are respectively wound up on supply spools 20 and 22 in the supply spool section 10 are selectively unwound and fed from the front guide section 12 to the printing section 14 for effecting a printing operation. The photographic paper 24 or 26 is then wound up into the take-up spool section 18 through the rear guide section 16. (Arrangement of the supply spool section 10)

The spools 20 and 22 in the supply spool section 10 are disposed in such a manner that their respective axes extend horizontally. Rolls 24A and 26A of photographic papers 24 and 26 with different widths are mounted on the respective spools 20 and 22.

Since the spools 20 and 22 have the same arrangement, the upper spool 20 alone will be described below in accordance with FIG. 3. The spool 20 is mounted on a rotary shaft 27 through two elastic wires wound around the outer periphery thereof at a distance in the axial direction of the spool 20. A center shaft 27A is secured through the axis of the rotary shaft 27 and is rotatably supported by the ball bearings 32 of a bearing 30 secured to a machine frame 28 which is disposed vertically. The roll 24A of photographic paper 24 previously wound in the shape of a roll is loaded on the spool 20. Then, a lever 34 which is disposed at the axially distal end of the center shaft 27A is turned so that the longitudinal axis of the lever 34 is substantially perpencidular to that of the center shaft 27A. In consequence, a slide shaft 35 moves toward the rotary shaft 27, causing the diameter of the spool 20 to be enlarged through the respective slanting surfaces of the slide shaft 35 and the rotary shaft 27. In this way, the roll 24A of photographic paper 24 is reliably secured to the outer periphery of the spool 20.

The leading end portion of the photographic paper 24 unwound from the roll 24A is passed over a guide roller 36 rotatably supported by the machine frame 28 and is then passed over a dancer roller 38 so that the photographic paper 24 is turned such as to reach the front guide section 12. This dancer roller 38 is, as shown in FIG. 3, rotatably supported at the distal end portion of an arm 40 in such a manner that as the tension applied to the photographic paper 24 increases, the arm 40 pivots so as to press a brake 42 (shown in FIG. 3) against a rotary member 41 provided coaxially with the spool 20, thereby applying a back tension to the photographic paper 24. These are known structures which are widely employed.

A disk 44 is coaxially disposed around the outer periphery of the bearing 30 so as to be movable relative to the bearing 30. The disk 44 has a plurality of small shafts 46 at respective positions near the peripheral edge thereof, The shafts 46 projecting parallel to the axis of the bearing 30. Rollers 48 are rotatably supported at the respective distal end portions of the small shafts 46. These rollers 48 are engaged with a ring groove 52 formed on the outer periphery of a flange boss 50, whereby the flange boss 50 is rotatably supported in its radial direction and, at the same time, has its axial movement restricted by means of the plurality of rollers 48. A flange 54 is secured to the flange boss 50. The flange 54 is disposed coaxially with the spool 20 and abuts against one of the axial ends of the roll of photographic paper 24 loaded on the outer periphery of the spool 20 so as to restrict the lateral movement of the photographic paper 24.

Accordingly, the flange 54 is able to rotate by means of the frictional force generated between the same and the axial end of the roll 24A of photographic paper 24 when it rotates in response to the unwinding of the paper 24. However, in order to restrict the lateral movement of the roll 24A, when it is loaded onto the spool 20, the operator presses the roll 24A in the axial direction of the spool 20 to a maximum extent so that one lateral end of the roll 24A abuts against the flange 54, and then turns the lever 34.

Figure 4:
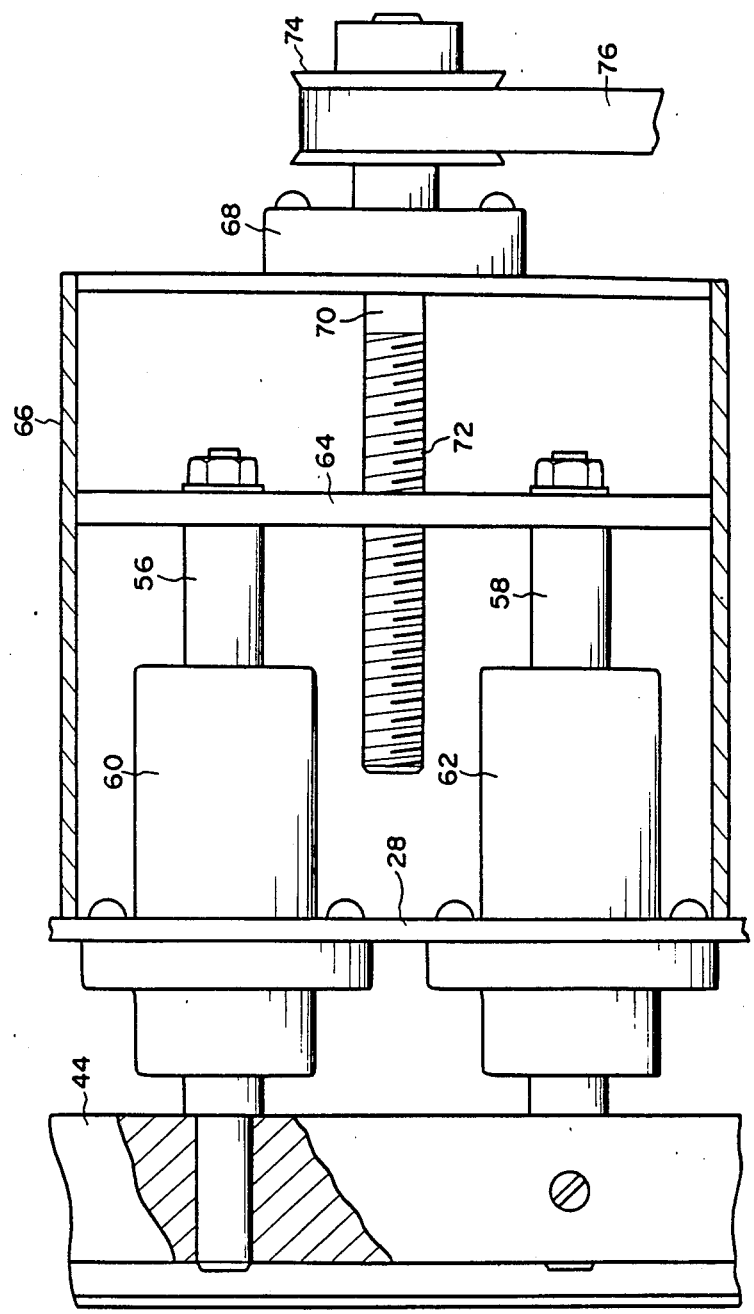
FIG. 4 is a sectional view taken along the line IV—IV of FIG. 3.

As also shown in FIG. 4, one end of each of a pair of drive shafts 56 and 58 is secured to the disk 44. These drive shafts 56 and 58 are respectively received through slide bearings 60 and 62 secured to the machine frame 28, and a connecting plate 64 is secured to the respective proximal end portions of the shafts 56 and 58. Thus, it is possible for the drive shafts 56 and 58 to move axially thereof at the same time.

Figure 5:
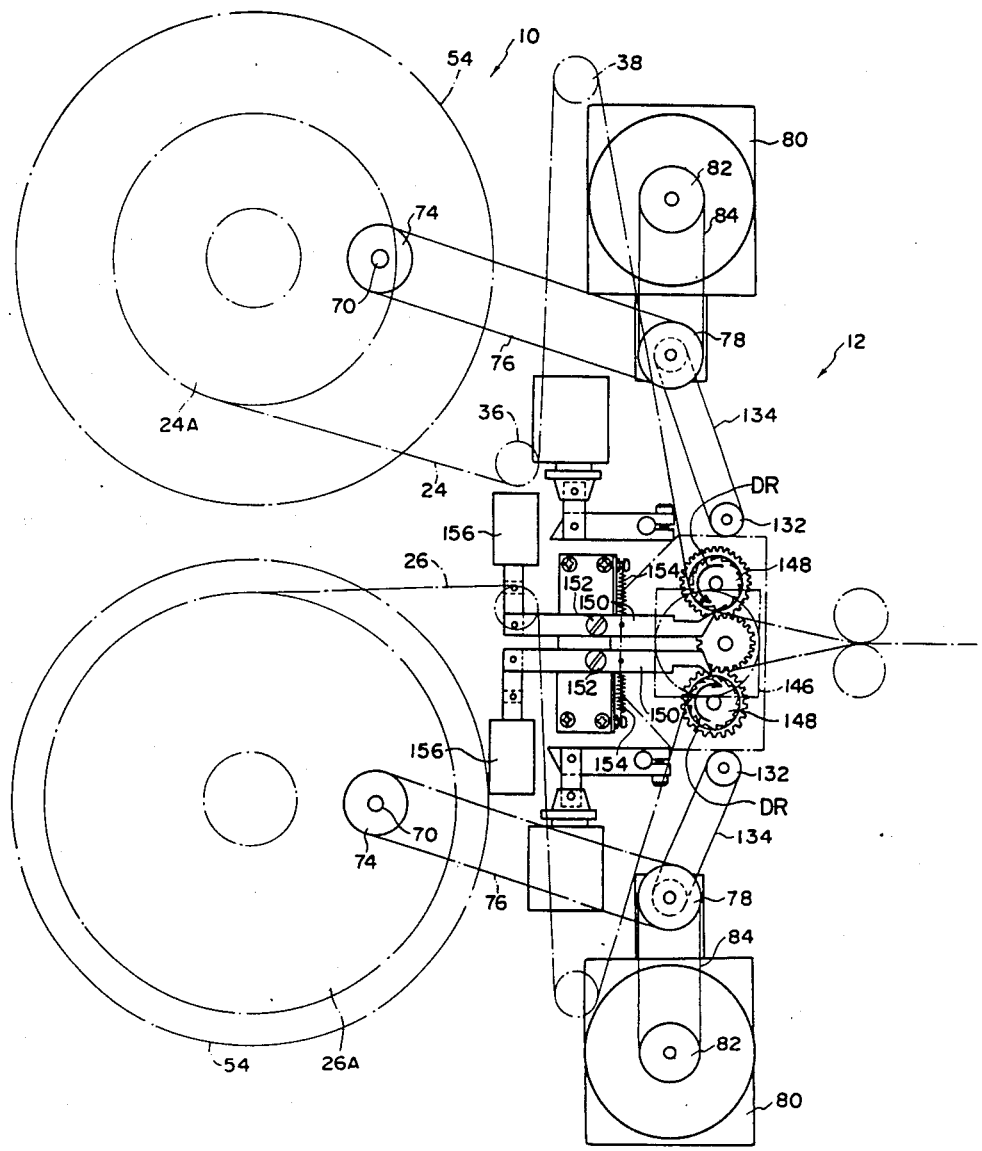
FIG. 5 is a sectional front elevational view of the respective drive mechanisms of the supply spool section and the front guide section shown in FIG. 1.

A U-shaped bracket 66 projects from the machine frame 28 toward the connecting plate 64. A rotary shaft 70 is rotatably supported by the bracket 66 through a bearing 68. One end portion of the rotary shaft 70 is formed with an external thread 72 and extends through the connecting plate 64 while engaging therewith through the internal thread formed therein. Thus, the rotary shaft 70 constitutes an adjusting means. A pulley 74 is secured to the other end portion of the rotary shaft 70, and a timing belt 76 is passed over the pulley 74. The timing belt 76 is passed over an intermediate pulley 78 as shown in FIG. 5. Another timing belt 84 is stretched between the intermediate pulley 78 and a pulley 82 secured to the output shaft of a motor 80.

Accordingly, as the motor 80 rotates, the rotary shaft 70 rotates. In consequence, the external thread 72 of the rotary shaft 70 causes the connecting plate 64 to move together with the drive shafts 56 and 58 in their axial direction, and the disk 44 is thereby moved to the right or left as viewed in FIG. 3. It is therefore possible for the rollers 48 of the disk 44 to move the flange 54 in the axial direction of the spool 20 through the flange boss 50. In this way, the flange 54 is moved in accordance with the width of the roll 24A loaded on the spool 20, so that the lateral center of the photographic paper 24 is made coincident with the optical axis of printing light P in the printing section 14. It is to be noted that the spool 22 disposed below the spool 20 employs a structure similar to the above, in which like portions or elements are denoted by like reference numerals.

(Arrangement of the Front Guide Section 12)

Figure 6:
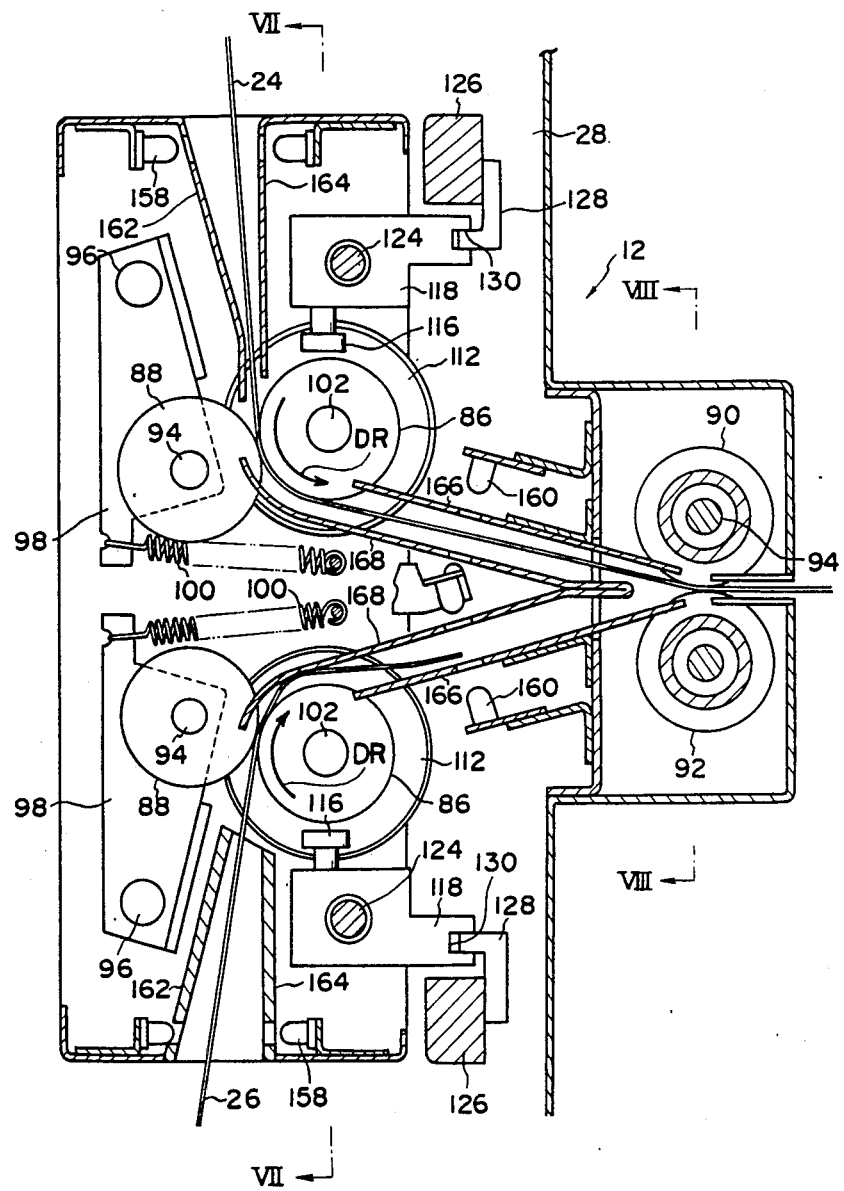
FIG. 6 is a front elevational view of the front guide section.

The guide portion of the front guide section 12 for the photographic paper 24 will be described below as typical. As shown in FIG. 6, the photographic paper 24 is fed out from the supply spool section 10 by the rotation (in the direction of the arrow DR) of a pair of loading guide rollers 86 and 88 while being clamped therebetween and is then passed through the area between a pair of light-shielding guide rollers 90 and 92 to reach the printing section 14.

The loading guide roller 88 is rotatably supported by a shaft 94 which is in turn rotatably supported at the distal end portion of a lever 98 pivotally supported by the machine frame 28 through a pin 96. This lever 98 is subjecte dto the biasing force of a tension coil spring 100 so that the loading guide roller 88 is pressed against the loading guide roller 86.

Figure 7:
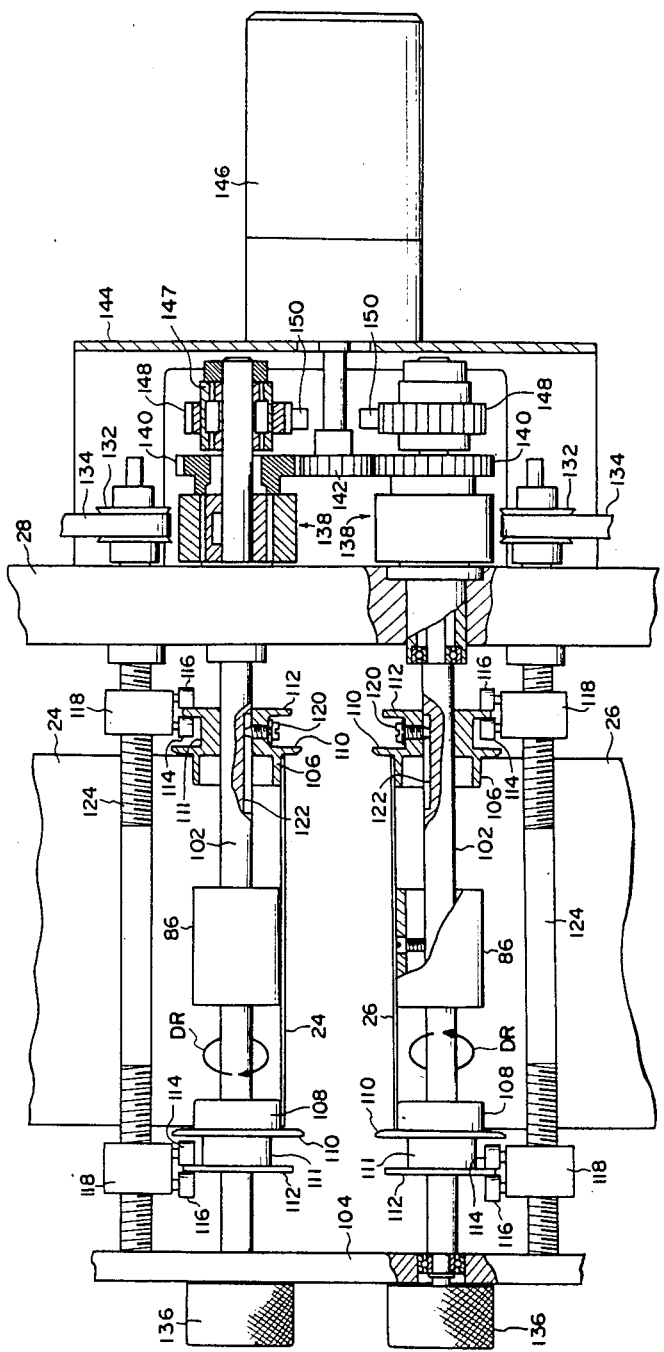
FIG. 7 is a sectional view taken along the line VII—VII of FIG. 6.

As shown in FIG. 7, the loading guide roller 86 is secured to a guide shaft 102 which has its longitudinal end portions rotatably supported by the machine frame 28 and a bracket 104, respectively, secured to the frame 28 and substantially parallel thereto.

A pair of width-restricting guide rollers 106 and 108 are mounted on both sides of the loading guide roller 86. These guide rollers 106 and 108 have the same diameter as the guide roller 86 and serve to guide both lateral edges of the photographic paper 24. In addition, each of the guide rollers 106 and 108 has a flange 110 projecting from one of its axial ends. Thus, the guide rollers 106 and 108 restrict the lateral movement of the photographic paper 24.

Each of the width-restricting guide rollers 106 and 108 further has a smaller-diameter portion 111 and a disk-shaped rib 112 which radially projects from the end thereof which is remote from the loading guide roller 86. Each of the disk-shaped ribs 112 provides abutment surfaces for drive rollers 114 and 116. More specifically, each pair of drive rollers 114 and 116 are rotatably supported by one of the corresponding movable blocks 118 in such a manner that their respective axes extend parallel to each other and perpendicular to the axis of the guide shaft 102.

Each pair of drive rollers 114 and 116 have their outer peripheries respectively abutting against the axial end faces of the corresponding disk-shaped rib 112 so as to clamp the same, thus constituting a guide member. As the movable block 118 moves axially of the guide shaft 102, the width-restricting guide roller 106 is able to move relative to the guide shaft 102 and parallel thereto. For this purpose, a set-screw 120 which is radially received through the width-restricting guide roller 106 is engaged with an axial groove 122 formed on the outer periphery of the guide shaft 102, thereby allowing the guide roller 106 to rotate with the rotation of the guide shaft 102 and to move axially of the shaft 102.

A pair of movable blocks 118 are in thread engagement with a rotary shaft 124 which is stretched between the machine frame 28 and the bracket 104 so as to be parallel to the guide shaft 102. In this case, however, an arm 128 which is secured to a bracket 126 projecting from the machine frame 28 as shown in FIG. 6 is engaged with a groove 130 partially formed in each movable block 118 so as to extend axially of the rotary shaft 124, whereby the movable block 118 is prevented from rotating around the rotary shaft 124 but is permitted to move only in the axial direction of the rotary shaft 124 when the shaft 124 rotates.

The portions of the rotary shaft 124 which are respectively engaged with the pair of movable blocks 118 have threads cut in opposite directions so that when the rotary shaft 124 rotates, the movable blocks 118 move toward or away from each other by the same distance.

As shown in FIG. 7, a pulley 132 is secured to the end portion of the rotary shaft 124 projecting from the machine frame 28, and a timing belt 134 is passed over the pulley 132. This timing belt 134 is passed over the intermediate pulley 78 which is subjected to the driving force transmitted from the pulley 82 as shown in FIG. 5. Accordingly, the distance between the width-restricting guide rollers 106 and 108 can be varied by moving the movable blocks 118 in the axial direction of the rotary shaft 124 by the rotation of the motor 80.

The flight pitch of the rotary shaft 124 is set so as to be the same as that of the external thread 72 formed on the rotary shaft 70 in the supply spool section 10. In consequence, as the motor 80 rotates, the width-restricting guide rollers 106 and 108 move by the same distance as that of the flange 54 in the supply spool section 10 so as to cope with a change in the width of the photographic paper used 24 or 26.

As shown in FIG. 7, the front end portion of the guide shaft 102 of the loading guide roller 86 projects from the bracket 104, and a knob 136 for a manual operation is secured to this end portion. With this knob 136, the operator can manually rotate the guide shaft 102 so as to feed the photogrpahic paper 24 toward the printing section 14.

The other end portion of the guide shaft 102 projects from the machine frame 28, and a gear 140 is mounted on the intermediate portion of this projecting end portion of the shaft 102 through an electromagnetic clutch 138. The gear 140 is meshed with a gear 142 which is secured to the output shaft of a motor 146 which is in turn secured to the machine frame 28 through a bracket 144. Accordingly, when the electromagnetic clutch 138 is engaged, the driving force of the motor 146 is transmitted to the guide shaft 102; when the clutch 138 is disengaged, no driving force is transmitted to the shaft 102 from the motor 146. It is therefore possible for the driving force of the motor 146 to be selectively transmitted to the pair of upper and lower guide shafts 102 by ON/OFF switching the corresponding electromagnetic clutches 138.

A ratchet wheel 148 is rotatably supported through a one-way clutch 147 on the outer periphery of the distal end portion of the guide shaft 102 adjacent to the gear 140. The ratchet wheel 148 is engaged with the pawl portion formed at the distal end of a lever 150 as shown in FIG. 5. The one-way clutch 147 allows the guide shaft 102 to rotate in the direction in which the loading guide roller 86 feeds the photographic paper 24, that is, in which the paper 24 is fed toward the printing section 14 (in the direction of the arrow DR). When the guide shaft 102 rotates in the above-mentioned direction, the one-way clutch 147 races, and therefore, the ratchet wheel 148 does not rotate. The guide shaft 102 is prevented from rotating in the reverse direction by the lever 150 engaged with the ratchet wheel 148, which is connected to the guide shaft 102 through the one-way clutch 147. By virtue of this arrangement, there is no risk of the loading guide roller 86 being reversed even when back tension is applied to the photographic paper 24 by means of the dancer roller 38.

The intermediate portion of the lever 150 is pivotally supported by the machine frame 28 through a screw 152. The lever 150 is subjected to the biasing force of a tensio coil spring 154 interposed between the lever 150 and the machine frame 28 so that the pawl portion at the distal end of the lever 150 is engaged with the ratchet wheel 148, thereby preventing the ratchet wheel 148 from rotating clockwise as viewed in FIG. 5 (opposite ot the direction of the arrow DR).

A solenoid 156 is provided at the opposite side of the lever 150. When the solenoid 15 is excited, the pawl portion of the lever 150 is disengaged from the ratchet wheel 148, thereby allowing the loading guide roller 86 to rotate in the reverse direction.

As shown in FIG. 6, a sensor 158 which can detect the passage of the photogrpahic paper 24 is provided at the inlet of the front guide section 12, the sensor 158 being constituted by a combination of a light-emitting diode and a phototransistor (the sensors described below are similarly arranged), and a similar sensor 160 between the loading guide roller 86 and the light-shielding guide roller 90.

In this front guide section 12, a guide portion for the photographic paper 26 unwound from the lower spool 22 is also arranged by employing elements similar to those described above, which are denoted by the same reference numerals as those of the elements constituting the guide portion for the photographic paper 24.

Figure 8:
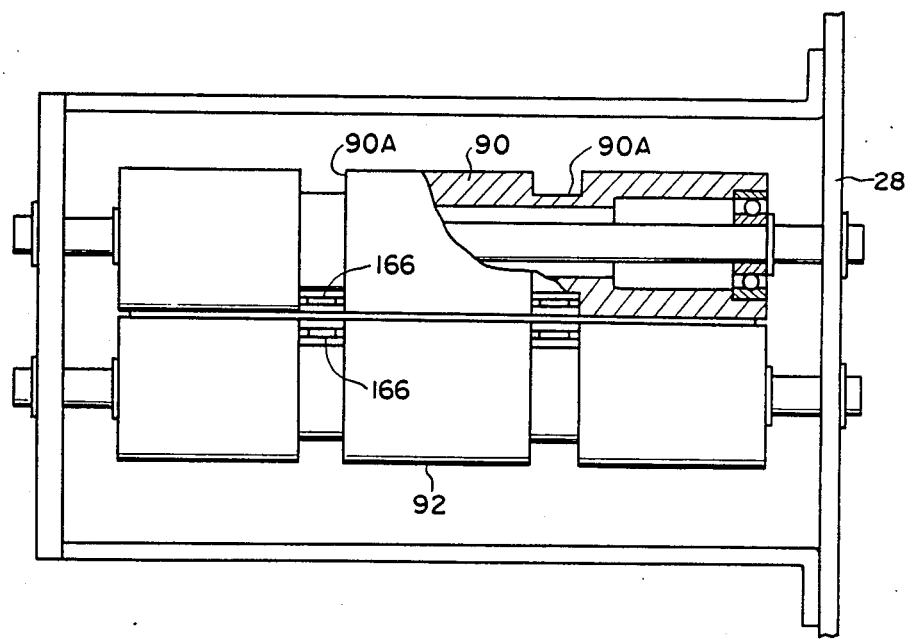
FIG. 8 is a sectional view taken along the line VIII—VIII of FIG. 6.

The front guide section 12 further has two pairs of guide plates 162 and 164 for guiding the photographic papers 24 and 26 from the supply spool section 10 to the pairs of loading guide rollers 86 and 88, respectively, each pair of guide plates 162 and 164 being disposed in such a manner that the distance therebetween gradually decreases toward the guide rollers 86 and 88. Further, guide plates 166 and 168 are disposed between the loading guide rollers 86, 88 and the light-shielding guide rollers 90, 92. The guide plates 166 are disposed on both sides of each of the loading guide rollers 86 in such a manner that the end of each guide plate 166 closer to the corresponding guide roller 86 is closer to the guide shaft 102 than the outer periphery of the guide roller 86. For the light-shielding guide roller 90 also, the end of each guide plate 166 which is closer thereto is engaged with a ring-shaped notch 90A formed in the guide roller 90 as shown in FIG. 8 (the same is the case with the light-shielding guide roller 92), thereby reliably guiding the photographic paper 24 or 26 into the area between the guide rollers 90 and 92.

The guide plates 168 are also disposed on both sides of each of the loading guide rollers 88 in such a manner that the end of each guide plate 168 which is closer to the corresponding guide roller 88 is closer to the shaft 94 than the outer periphery of the guide roller 88. The respective ends of the guide plates 168 which are closer to the corresponding light-shielding guide rollers 90 and 92 are connected together so that the guide passages for the photographic papers 24 and 26 join together immediately before the light-shielding guide rollers 90 and 92. (Description of the printing section 14)

As shown in FIG. 1, the photographic paper 24 or 26 fed from the front guide section 12 is continuously fed to the rear guide section 16 through a cutter 169 and an easel mask 170. During transportation, the feed of the photographic paper 24 or 26 is temporarily suspended, and a printing operation is carrried out at the printing section 14. An optical system, including a lens 171, and a negative film carrier 173 are disposed below the easel mask 170. The image of a negative film positioned on the optical axis P is printed on the photographic paper 24 or 26 by means of a light source 174.

The negative film 172 has both longitudinal ends wound up on respective reels (not shown) so as to be fed successively.

(Arrangement of the Rear Guide Section 16)

Figure 9:
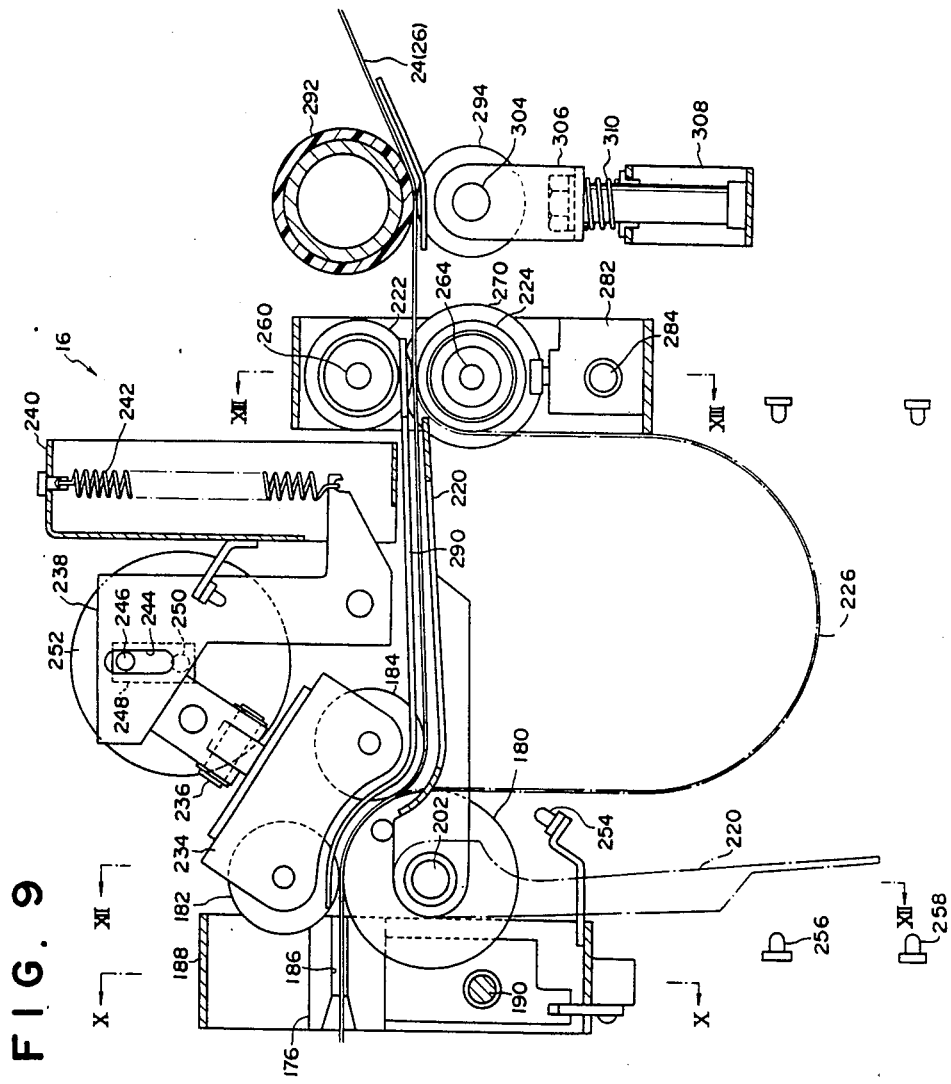
FIG. 9 is a front elevational view of the rear guide section shown in FIG. 9.
Figure 10:
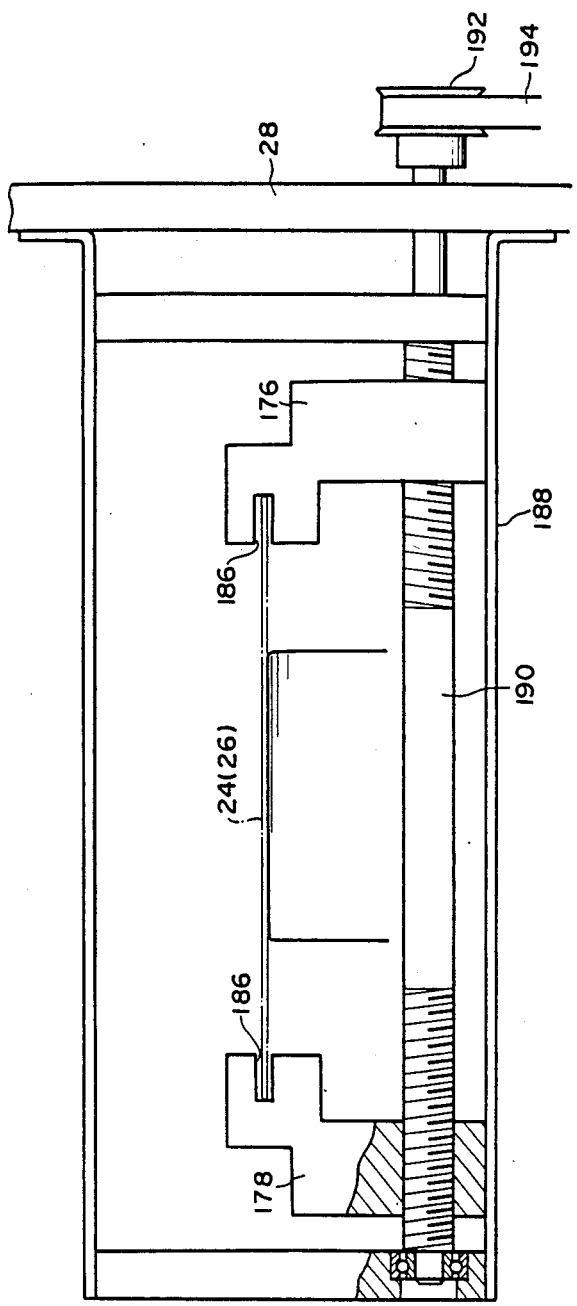
FIG. 10 is a sectional view taken along the line X—X of FIG. 9.

As shown in FIGS. 9 and 10, the photographic paper 24 or 26 fed from the printing section 14 is guided by a pair of opposing guide blocks 176 and 178 and is then clamped between a main drive roller 180 and press rollers 182 and 184.

The opposing surfaces of the guide blocks 176 and 178 are, as shown in FIG. 10, respectively formed with grooves 186 which serve to restrict the lateral movement of the photographic paper 24 or 26 when it is fed.

These guide blocks 176 and 178 are in thread engagement with a rotary shaft 190 rotatably supported by the machine frame 28 and a bracket 188 secured to the frame 28. The portion of the rotary shaft 190 which is engaged with the guide block 176 and that which is engaged with the guide block 178 respectively have threads which are cut in opposite directions. One portion of each of the guide blocks 176 and 178 abuts against the bracket 188 so that the guide blocks 176 and 178 are prevented from rotating around the rotary shaft 190. Accordingly, when the rotary shaft 190 rotates, the guide blocks 176 and 178 move toward or away from each other. The flight pitches of the portions of the rotary shaft 190 engaged with the guide blocks 176 and 178 are equal to each other and are also equal to the pitch of the external thread 72 of the rotary shaft 170 in the supply spool section 10.

Figure 11:
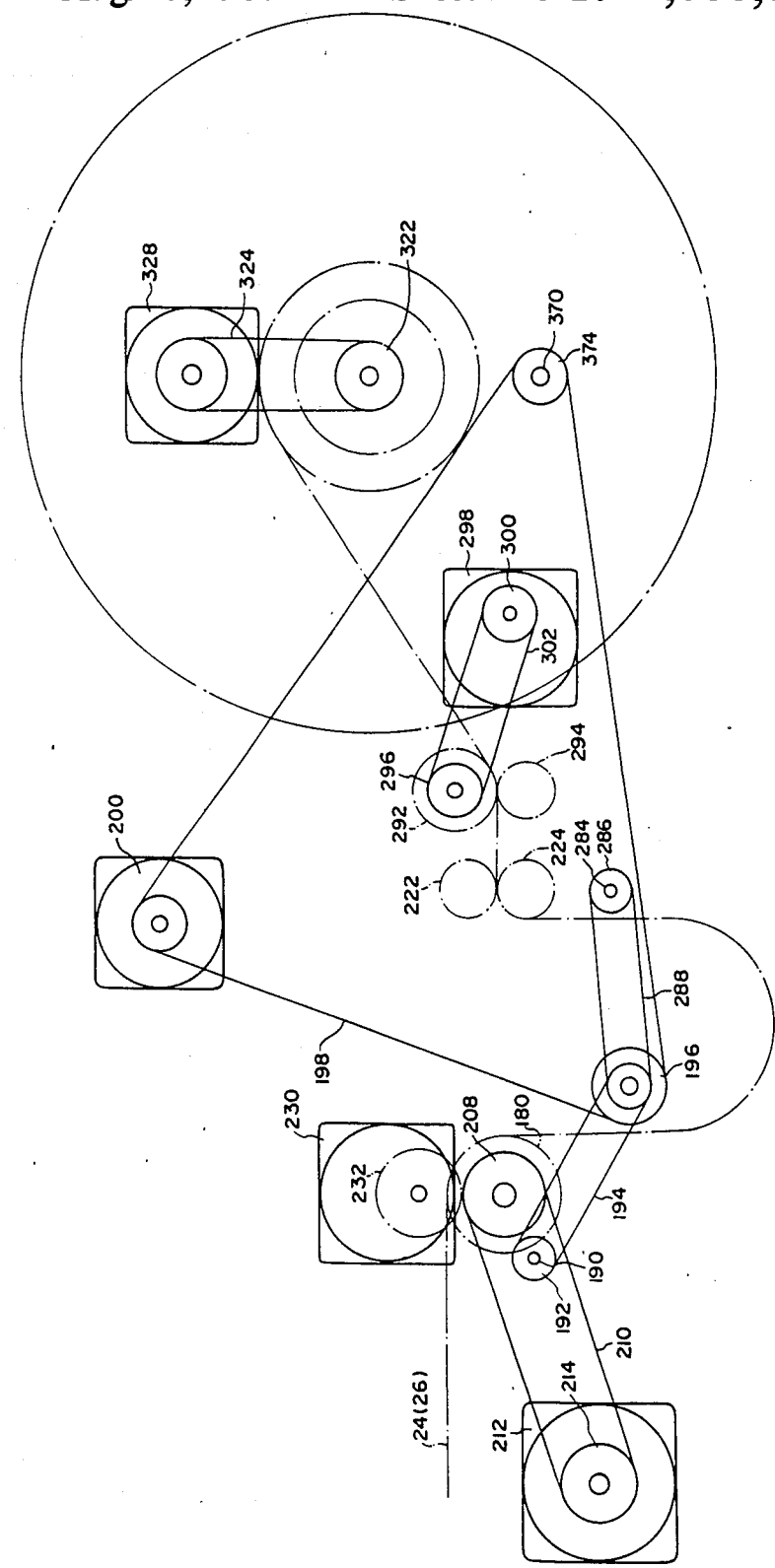
FIG. 11 is a sectional front elevational view of the respective drive mechanisms of the rear guide section and the take-up spool section shown in FIG. 1.

A pulley 192 is secured to the end portion of the rotary shaft 190 projecting from the machine frame 28, and a timing belt 194 is passed over the pulley 192. This timing belt 194 is, as shown in FIG. 11, passed over an intermediate pulley 196 to which the rotational force of a motor 200 is transmitted through a timing belt 198.

Accordingly, as the motor 200 rotates, the rotary shaft 190 is rotated by the driving force of the motor 200 transmitted through the timing belts 198 and 194, causing the guide blocks 176 and 178 to move toward or away from each other by the same amount, thereby coping with any change in the width of the photographic paper used 24 or 26.

Figure 12:
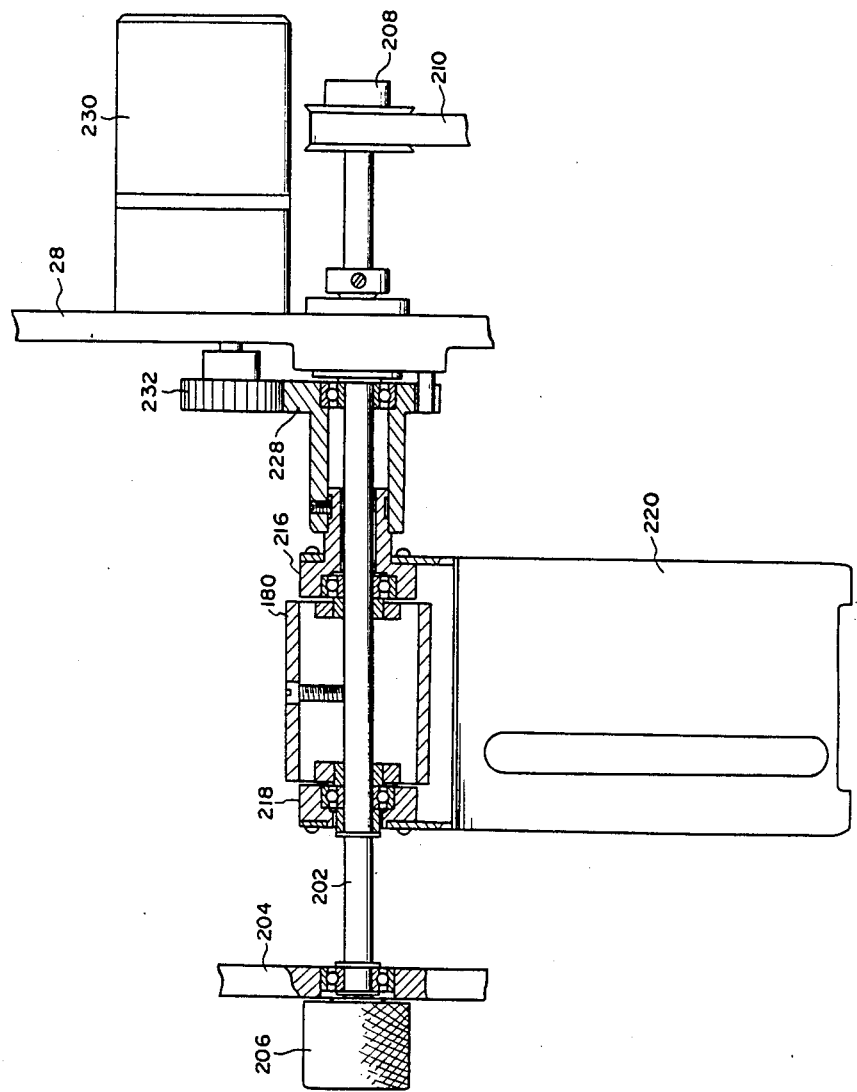
FIG. 12 is a sectional view taken along the line XII—XII of FIG. 9.

As shown in FIG. 12, the main drive roller 180 is coaxially secured to a roller shaft 202 which has both end portions rotatably supported respectively by the machine frame 28 and a bracket 204 which is secured to the frame 28 parallel thereto. A knob 206 is secured to the end portion of the roller shaft 202 projecting from the bracket 204 so as to be held by the operator when a manaul operation is required. A pulley 208 is secured to the end portion of the roller shaft 202 projecting from the machine frame 28, and a timing belt 210 is passed over the pulley 208. This timing belt 210 is, as shown in FIG. 11, passed over a pulley 214 secured to the output shaft of a motor 212. In consequence, as the motor 212 rotates, the main drive roller 180 is rotated by the rotational force of the motor 212 transmitted through the timing belt 210, thereby feeding the photographic paper 24 or 26 by a predetermined amount. For this purpose, the motor 212 is preferably constituted by a pulse motor, which provides an accurate feed.

Rotors 216 and 218 are rotatably supported on the outer periphery of the roller shaft 202 so as to be located at both sides of the main drive roller 180. One of the longitudinal ends of a pivotal guide plate 220 is secured to the rotors 216 and 218. This pivotal guide plate 220 can pivot about the roller shaft 202 between two positions, that is, the position where it is disposed substantially horizontal as shown by the solid line in FIG. 9, so as to transfer the leading end of the photographic paper 24 or 26 into the area between guide rollers 222 and 224 provided at the downstream side of the main drive roller 180, and the position where the guide plate 220 is disposed substantially vertical as shown by the imaginary line in FIG. 9, so as to enable a loop 226 of the photographic paper 24 or 26 to be formed between the main drive roller 180 and the guide roller 224.

For this purpose, a gear 228 is secured to the rotor 216 as shown in FIG. 12. The gear 228 is meshed with a gear 232 which is secured to the output shaft of a motor 230 mounted on the machine frame 28, whereby the guide plate 220 is pivoted by the rotational force of the motor 230.

As shown in FIG. 9, the press rollers 182 and 184 are rotatably supported by a movable bracket 234 which is in turn rotatably supported by the distal end portion of a lever 238 through a pin 236 which is disposed in such a manner than the axis of the pin 236 extends perpendicular to the respective axes of the press rollers 182 and 184. The pin 236 allows the press rollers 182 and 184 to swing so that the axes of the press rollers 182 and 184 and parallel to the axis of the main drive roller 180, thereby allowing the photographic paper 24 or 26 to be accurately clamped between the main drive roller 180 and the press rollers 182 and 184.

A tension coil spring 242 is interposed between the tail end portion of the lever 238 and a bracket 240 which is secured to the machine frame 28. Thus, the press rollers 182 and 184 are biased by the spring 242 so as to be pressed against the main drive roller 180. A pin 246 projecting from a rotary arm 248 is received through a slot 244 formed in the intermediate portion of the lever 238. The pin 246 is disposed at a position eccentric with respect to a rotary shaft 250 for the rotary arm 248. The rotary shaft 250 is secured to the output shaft of a motor 252. Accordingly, as the motor 252 rotates, the pin 246 moves in the lateral direction of the slot 244, causing the lever 238 to pivot, thereby allowing the press rollers 182 and 184 to move away from the main drive roller 180.

It is to be noted that sensors 254, 256 and 258 are provided in this rear guide section 16, the sensor 254 being employed to detect that the leading end of the photographic paper 24 or 26 has come out of the area between the main drive roller 180 and the press roller 184, and the sensors 256 and 258 being employed to detect that the loop 226 is of the appropriate size.

Figure 13:
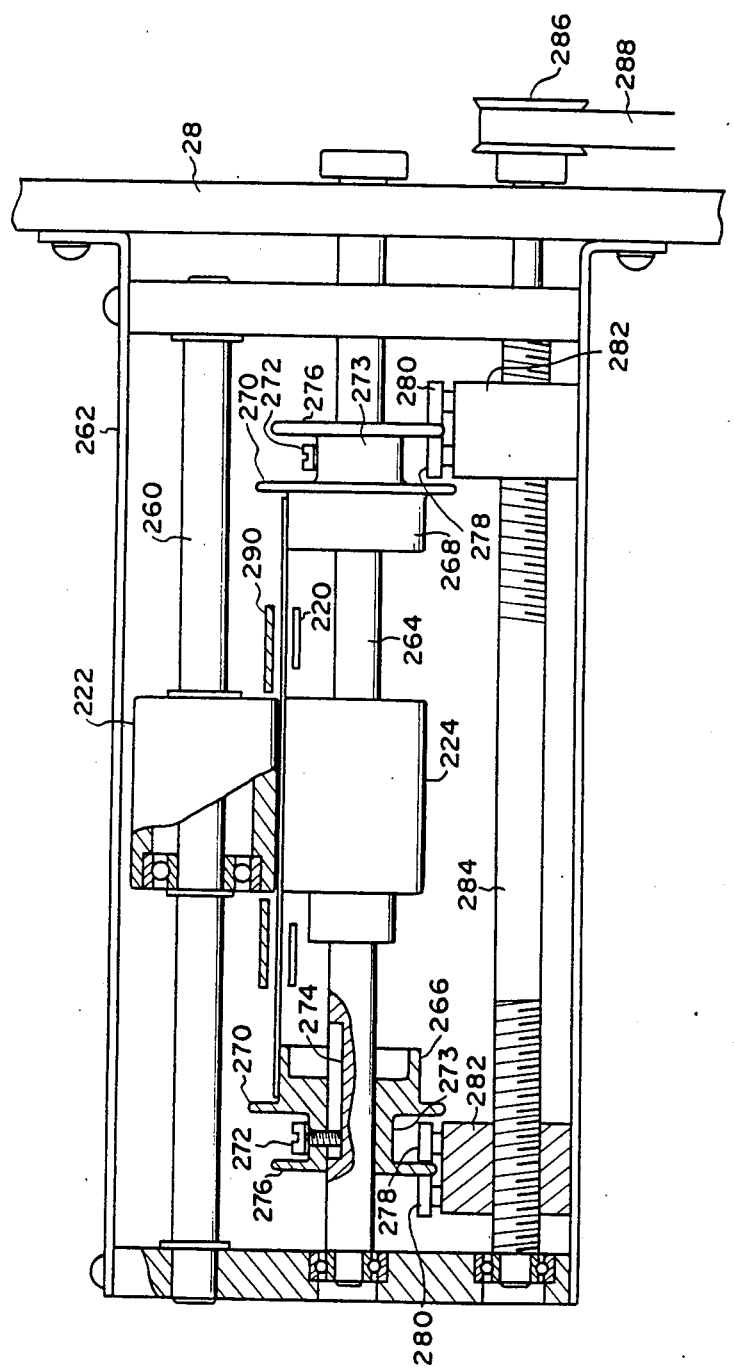
FIG. 13 is a sectional view taken along the line XIII—XIII of FIG. 9.

As shown in FIG. 13, the guide roller 222 is rotatably supported on a shaft 260 which is secured to the machine frame 28 through a bracket 262.

The guide roller 224 is arranged in a manner similar to that of the loading guide rollers 86 shown in FIG. 7. More specifically, the guide roller 224 is secured to a guide shaft 264 which has width-restricting guide rollers 266 and 268 respectively disposed on both sides of the guide roller 224. The width-restricting guide rollers 266 and 268 have the same diameter as the guide roller 224. The guide rollers 266 and 268 respectively have radially-projecting flanges 270 which abut against both lateral edges of the photographic paper 24 or 26 being transported, thereby restricting the lateral movement of the photographic paper 24 or 26.

Set-screws 272 are radially received through the width-restricting guide rollers 266 and 268, respectively. The set-screws 272 are engaged with respective grooves 274 axially formed on the outer periphery of the guide shaft 264. In consequence, the guide rollers 266 and 268 are rotatable together with the guide shaft 264 and also movable in the axial direction of the shaft 264.

Each of the width-restricting guide rollers 266 and 268 further has a smaller-diameter portion 273 and a disk-shaped rib 276 which radially projects from the end thereof which is remote from the guide roller 224. Each pair of drive rollers 278 and 280 have their outer peripheries respectively abutting against the axial end faces of the corresponding disk-shaped rib 276. The pairs of drive rollers 278 and 280 are rotatably supported by corresponding movable blocks 282 in such a manner that their respective axes extend parallel to each other and perpendicular to the axis of the guide shaft 264. These movable blocks 282 are in thread engagement with a rotary shaft 284 which is rotatably supported by the bracket 262. The portions of the rotary shaft 284 which are respectively engaged with the pair of movable blocks 282 have threads cut in opposite directions so that when the rotary shaft 284 rotates in one direction, the movable blocks 282 move toward or away from each other by the same distance so as to change the distance between the width-restricting guide rollers 266 and 268, thus making it possible to cope with any change in the width of the photographic paper used 24 ot 26. The flight pitch of the rotary shaft 284 is equal to that of the external thread 72 of the rotary shaft 70 in the supply spool section 10.

A pulley 286 is secured to the end portion of the rotary shaft 284 projecting from the machine frame 28, and a timing belt 288 is passed over the pulley 286. The timing belt 288 is, as shown in FIG. 11, passed over the intermediate pulley 196 so that the rotational force of the motor 200 is transmitted to the rotary shaft 284. Accordingly, the rotary shaft 284 can rotate at the same number of revolutions as that of the rotary shaft 190. It is to be noted that, as shown in FIG. 9, a guide plate 290 is disposed between the press rollers 182, 184 and the guide roller 222 so as to guide the photographic paper 24 or 26 into the area between the guide rollers 222 and 224. The distal end of the guide plate 290 is forked, and the two portions constituting the forked end are respectively disposed at both axial ends of the guide roller 222 so to be closer to the shaft 260 than the outer periphery of the guide roller 222, thereby allowing the photographic paper 24 or 26 to be reliably fed into the area between the guide rollers 222 and 224.

As shown in FIG. 9, the photographic paper 24 or 26 fed out from the area between the guide rollers 222 and 224 is clamped between a lead-in roller 292 and a press roller 294 before being fed into the take-up spool section 18. As shown in FIG. 11, a pulley 296 is secured to the lead-in roller 292, and a timing belt 302 is stretched between the pulley 296 and a pulley 300 secured to the output shaft of a motor 298.

The press roller 294 is rotatably supported through a pin 304 by a bracket 306 which is slidably supported by a bracket 308 secured to the machine frame 28. A compression coil spring 310 is interposed between the brackets 306 and 308 so as to press the photographic paper 24 or 26 against the lead-in roller 292.

(Arrangement of the Take-up Spool Section 18)

Figure 3:
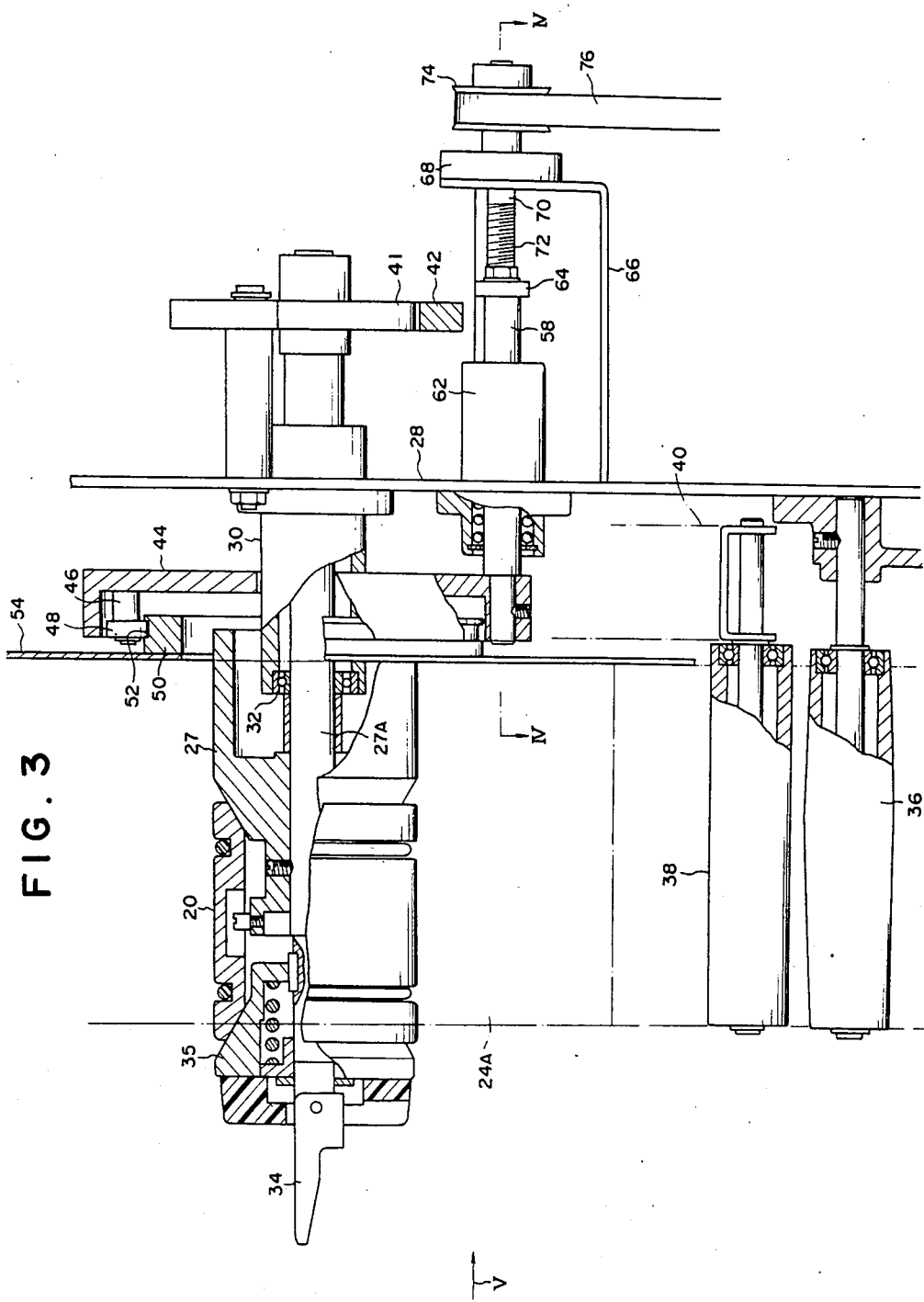
FIG. 3 is a sectional view taken along the line III—III of FIG. 1.
Figure 15:
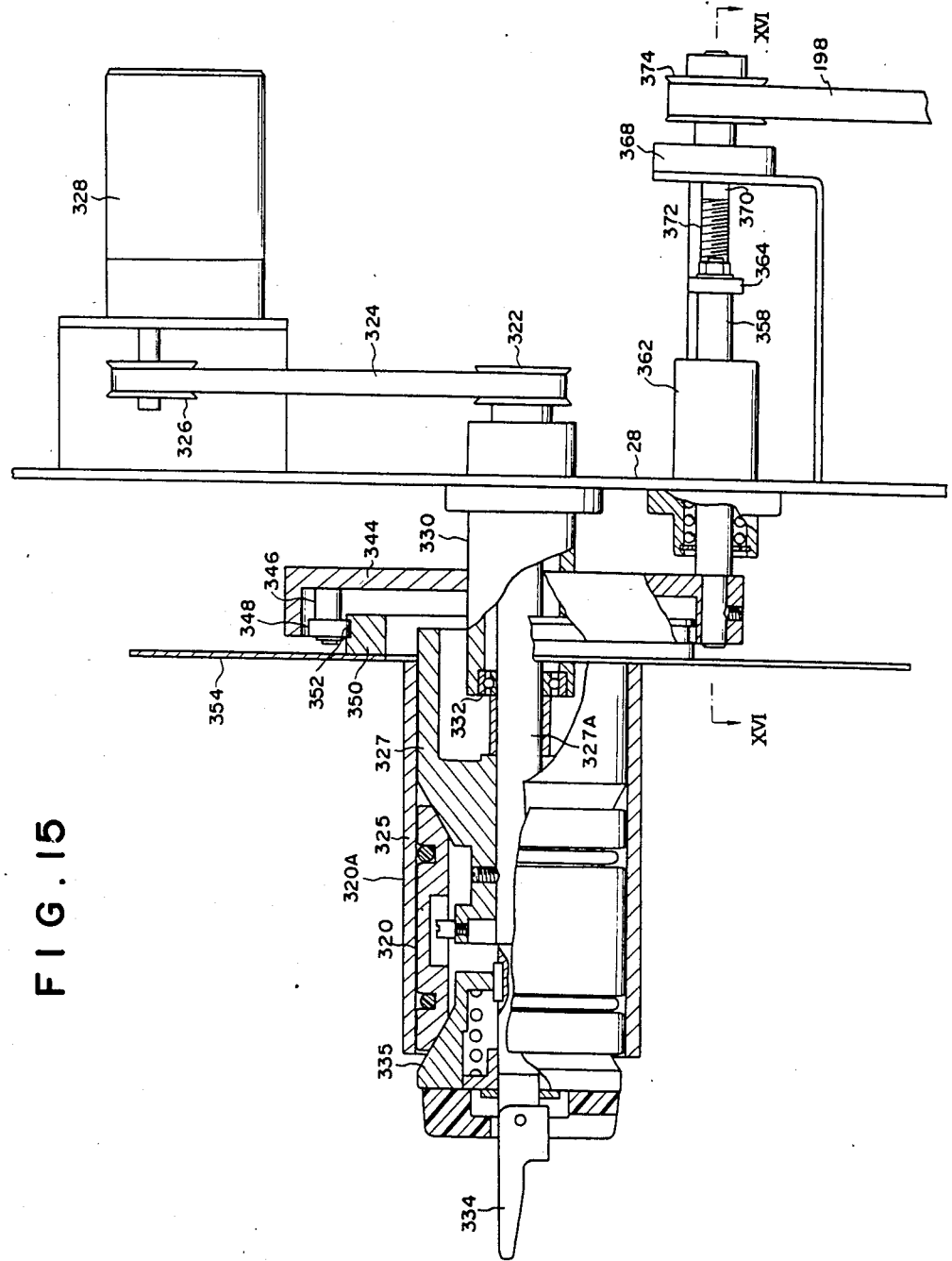
FIG. 15 is a sectional view taken along the line XV—XV of FIG. 14.

The structure for loading the photographic paper 24 or 26 on a take-up spool 320 and means for restricting the lateral movement of the photographic paper 24 or 26 in the take-up spool section 18 are substantially similar to those in the supply spool section 10 shown in FIGS. 3 and 4. More specifically, as shown in FIG. 15, the spool 320 is mounted on a rotary shaft 327, and a center shaft 327A fixedly received through the axis of the rotary shaft 327 is rotatably supported by the ball bearings 332 of a bearing 330 which is secured to the machine frame 28 disposed vertically. A roll core 320A is fitted on the spool 320, and a lever 334 disposed at the axially distal end of the center shaft 327A is turned. In consequence, a slide shaft 335 moves toward the rotary shaft 327, causing the diameter of the spool 320 to be enlarged, thereby allowing the roll core 320A to be reliably fixed on the spool 320.

A disk 344 is coaxially disposed on the outer periphery of the bearing 330 so as to be movable relative to the bearing 30. The disk 344 has a plurality of small shafts 346 at respective positions near the peripheral edge thereof, the shafts 346 projecting parallel to the axis of the bearing 330. Rollers 348 are rotatably supported at the respective distal end portions of the small shafts 346. These rollers 348 are engaged with a ring groove 352 formed on the outer periphery of a flange boss 350, whereby the flange boss 350 is rotatably supported in the radial direction and, at the same time, has its axial movement restricted by means of the plurality of rollers 348. A flange 354 is secured to the flange boss 350. The flange 354 is disposed coaxially with the spool 320 and abuts against one of the axial ends of the roll of photographic paper 24 or 26 wound onto the outer periphery of the spool 320 through the roll core 320A so as to restrict the lateral movement of the photographic paper 24 or 26.

Accordingly, the flange 354 is able to rotate by means of the frictional force generated between the same and the lateral edge of the photographic paper 24 or 26 when it is wound up.

Figure 16:
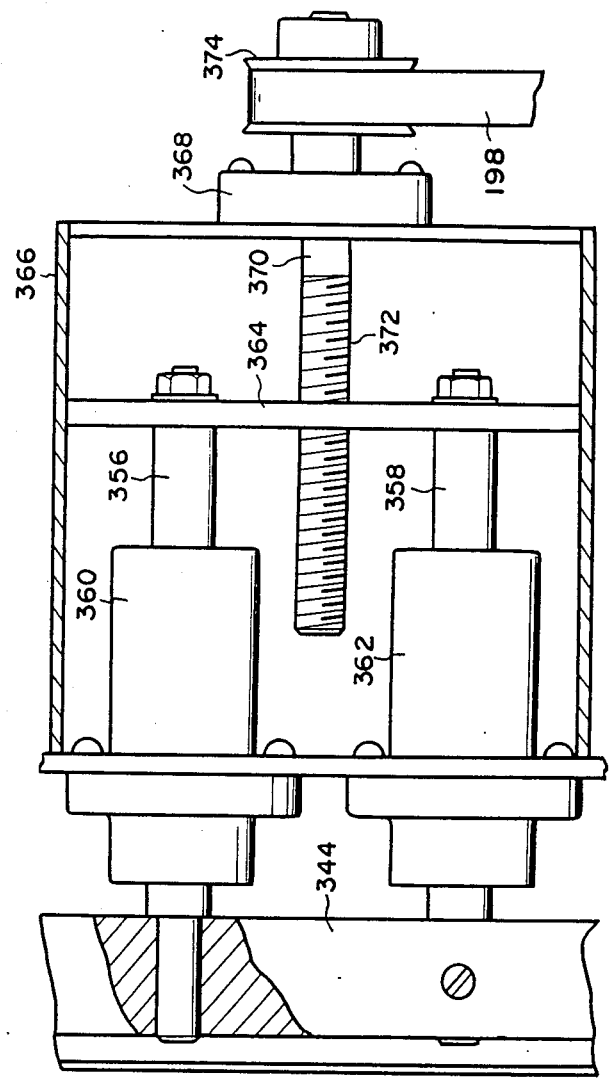
FIG. 16 is a sectional view taken along the line XVI—XVI of FIG. 15.

As also shown in FIG. 16, one end of each of a pair of drive shafts 356 and 358 is secured to the disk 344. These drive shafts 356 and 358 are respectively received through slide bearings 360 and 362 secured to the machine frame 28, and a connecting plate 364 is secured to the respective proximal end portions of the shafts 356 and 358. Thus, it is possible for the drive shafts 356 and 358 to move axially thereof at the same time.

A U-shaped bracket 366 projects from the machine frame 28 toward the connecting plate 364. A rotary shaft 370 is rotatably supported by the bracket 366 through a bearing 368. One end portion of the rotary shaft 370 is formed with an external thread 372 and extends through the connecting plate 364 while engaging therewith through the internal thread formed therein. A pulley 374 is secured to the other end portion of the rotary shaft 370, and the timing belt 198 is passed over the pulley 372. The timing belt 198, together with the pulley 286 and the like, is subjected to the driving force of the motor 200, as shown in FIG. 11. The external thread 372 has the same pitch as that of the external thread 72 of the rotary shaft 70 in the supply spool section 10.

Accordingly, as the motor 200 rotates, the rotary shaft 370 rotates. In consequence, the external thread 372 causes the connecting plate 364 to move together with the drive shafts 356 and 358 in their axial direction, and the disk 344 is thereby moved to the right or left as viewed in FIG. 15. It is therefore possible for the rollers 348 of the disk 344 to move the flange 354 in the axial direction of the spool 320 through the flange boss 350, so that it is possible to cope with any change in the width of the photographic paper used.

Figure 14:
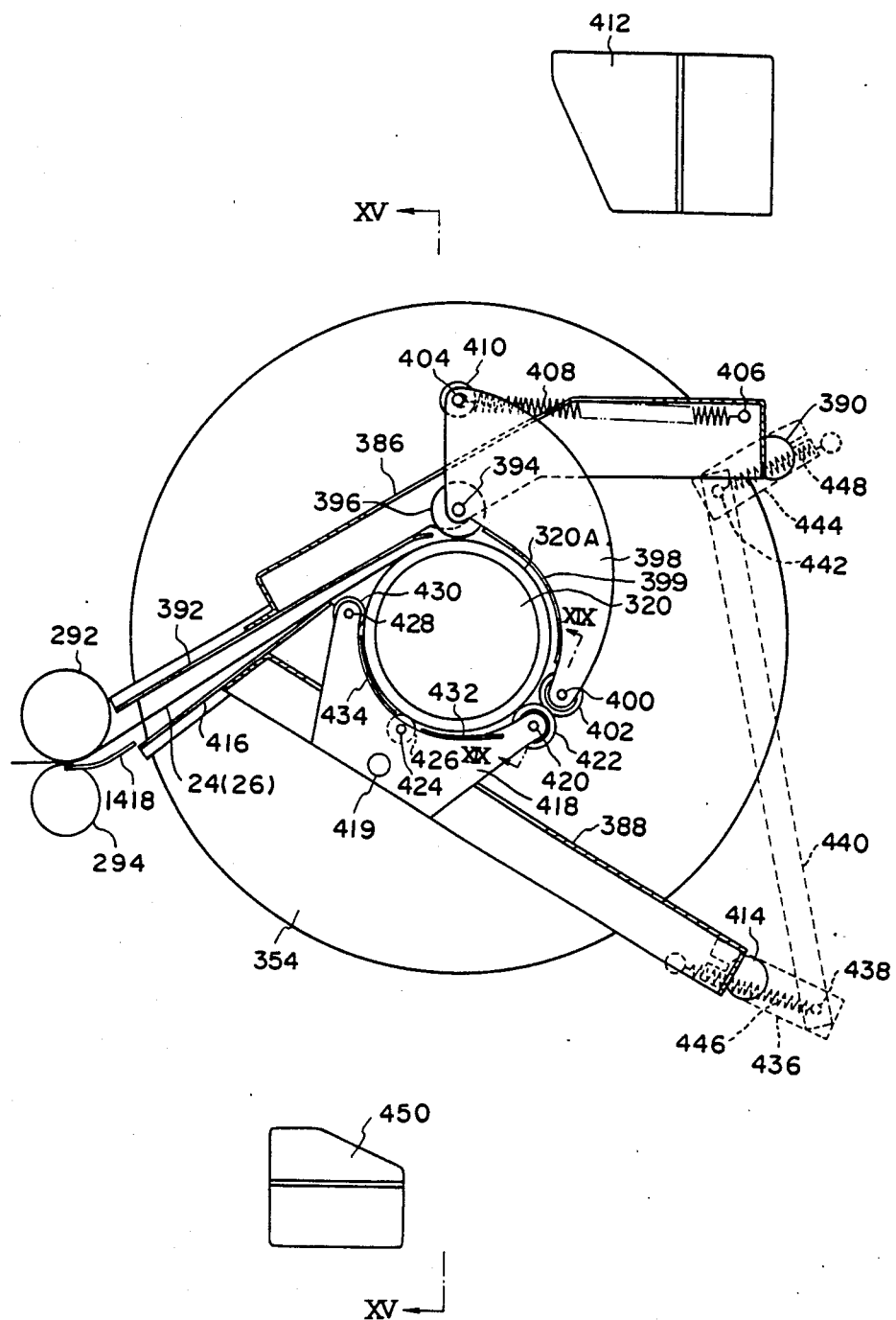
FIG. 14 is an enlarged front elevational view of the take-up spool section.
Figure 20:
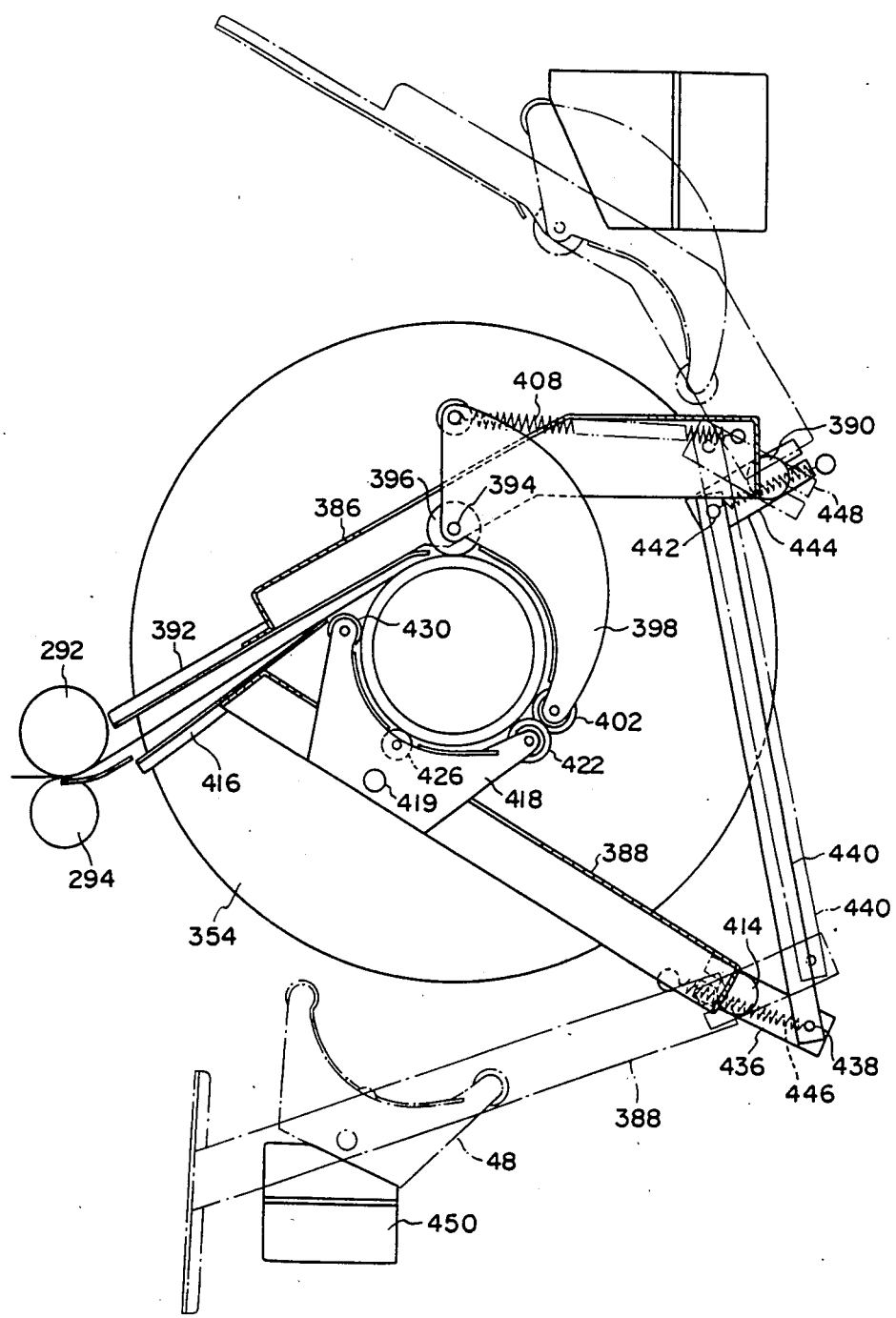
FIG. 20 is a sectional front elevational view of the levers and other members shown in FIG. 14.

The following is a description of a pair of automatic take-up guide arms 386 and 388 provided in the take-up spool section 18. As shown in FIGS. 14 and 20, one end of the guide arm 386 is secured to a shaft 390 which is pivotally supported by the machine frame 28.

A guide plate 392 is provided on the distal end portion of the guide arm 386. When the guide arm 386 is positioned maximumly close to the spool 320 as shown in FIGS. 14 and 20, the distal end of the guide plate 392 is positioned in the vicinity of the outer periphery of the lead-in roller 292 so that the photographic paper 24 or 26 fed out from the area between the lead-in roller 292 and the press roller 294 is smoothly guided to the outer periphery of the spool 320 (the roll core 320A).

A pressure roller 396 is rotatably supported through a pin 394 at the central portion of the guide arm 386. The pressure roller 396 serves to feed the photographic paper 24 or 26 guided by the guide plate 392 and reaching the outer periphery of the spool 320 while clamping the photographic paper 24 or 26 between the same and the spool 320 (the roll core 320A).

Figure 17:
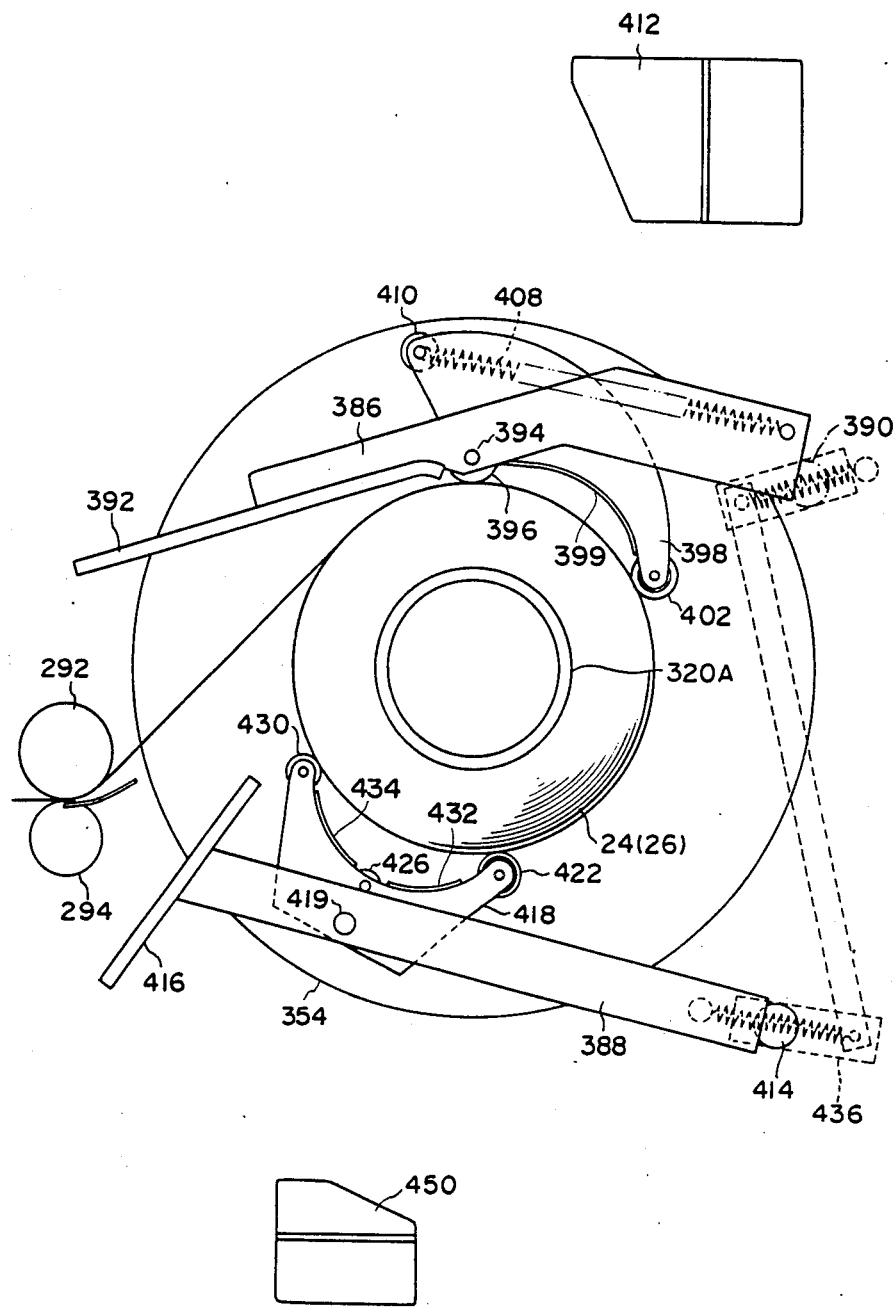
FIGS. 17 and 18 are views showing the operation of the take-up spool section.

The pin 394 pivotally supports the central portion of a pivotal arm 398 which has at one end thereof a pressure roller 402 rotatably supported by a pin 400. A circular guide plate 399 is secured to the portion of the pivotal arm 398 between the pressure rollers 396 and 402 so as to guide the leading end portion of the photographic paper 24 or 26. A tension coil spring 408 is interposed between a pin 404 disposed at one end of the pivotal arm 398 and a pin 406 disposed in the vicinity of the portion of the guide arm 386 at which the guide arm 386 is secured to the shaft 390. Thus, the pivotal arm 398 is biased by the spring 408 in the direction in which the pressure roller 402 is pressed against the outer periphery of the spool 320. Accordingly, as the outer diameter of the roll of photographic paper 24 or 26 being wound up on the spool 320 (the roll core 320A) increases as shown in FIG. 17, the pivotal arm 398 pivots counterclockwise relative to the guide arm 386 against the biasing force of the tension coil spring 408, thereby coping with a change in the roll diameter.

Figure 18:
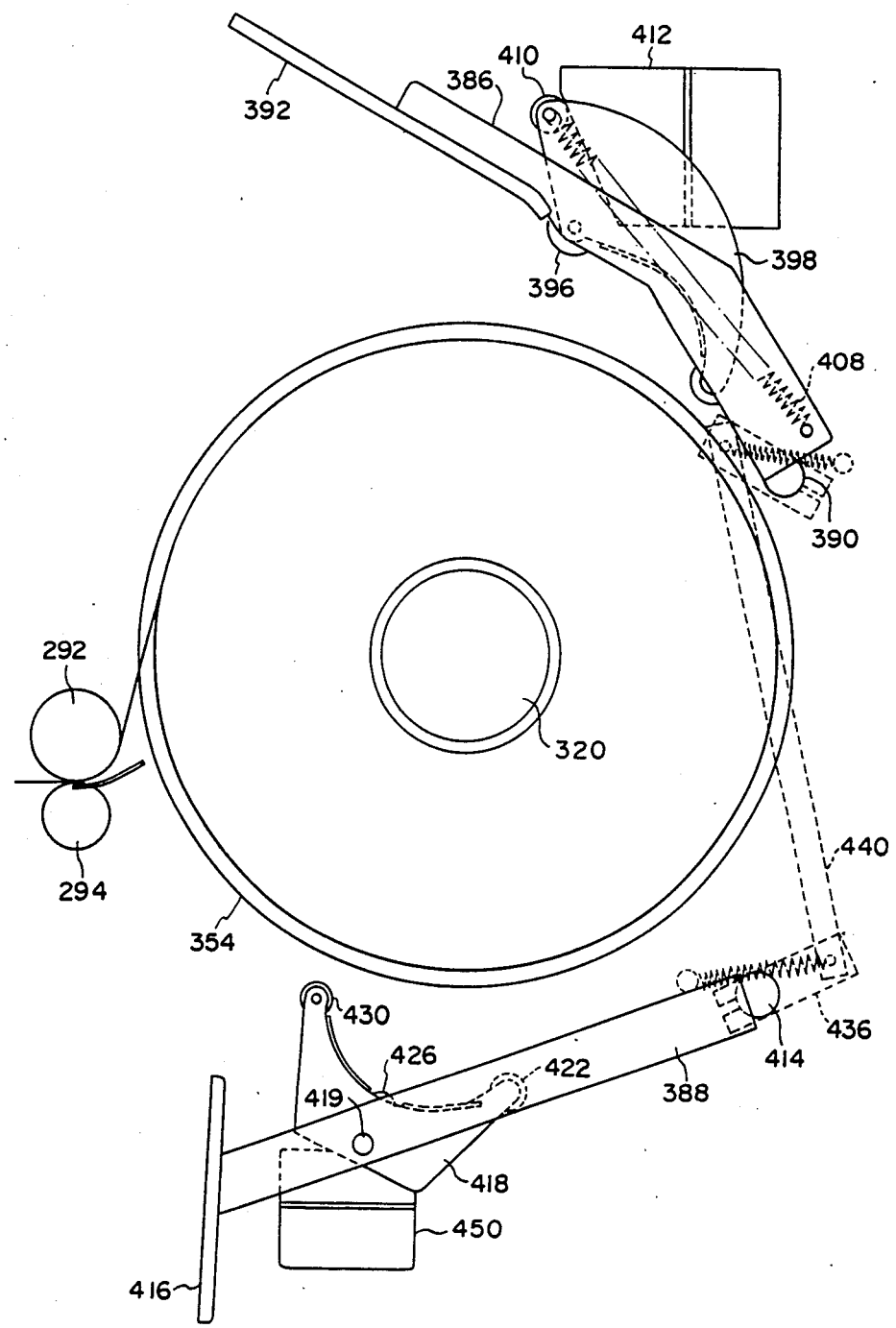

A roller 410 is rotatably supported by the pin 404. When the guide arm 386 is maximumly rotated clockwise about the shaft 390 as shown in FIGS. 18 and 20, the roller 410 abuts against a guide block 412 secured to the machine frame 28, thus causing the pivotal arm 398 to pivot counterclockwise to a large extent relative to the guide arm 386 so that the pivotal arm 398 is retracted beyond the outer periphery of the flange 354, thereby preventing the pivotal arm 398 from obstructing the operation of unloading the photographic paper 24 or 26 wound up.

One end of the guide arm 388 is rotatably supported by the machine frame 28 through a shaft 414. A guide plate 416 is secured to the distal end portion of the guide arm 388. When the distal end of the guide arm 388 is positioned as close as possible to the spool 320, the guide plate 416 is positioned between the press roller 294 and the spool 320 so as to guide, in cooperation with the guide plate 392, the photographic paper 24 or 26 fed out from the area between the rollers 292 and 294 to the outer periphery of the spool 320 (the roll core 320A). In order to ensure the operation of the guide plate 416, a guide plate bracket 1418 is disposed on the lead-out side of the press roller 294 so as to transfer the photographic paper 24 or 26 to the guide plate 416.

A bracket 418 is rotatably supported at the intermediate portion of the guide arm 388 through a pin 419. A pressure roller 422 is rotatably supported through a pin 420 at one end of the bracket 418. The pressure rollers 422 is engaged with the pressure roller 402. More specifically, as shown in FIG. 19, each of the pressure roller 402 and 422 has annular projections and recesses which are engaged with those of the other roller, thereby preventing the leading end portion of the photographic paper 24 or 26 fed from the pressure roller 396 from advancing radially outward of the spool 320 through the gap between the distal ends of the pressure rollers 402 and 422 which might otherwise be produced therebetween.

Further, pressure rollers 426 and 430 are rotatably supported at the intermediate and other end portions of the bracket 418 through pins 424 and 428, respectively. All of the pressure rollers 422, 426 and 430 are in contact with the outer periphery of the spool 320 so as to guide and feed the leading end portion of the photographic paper 24 or 26 toward the pressure roller 396, thereby allowing the photographic paper 24 or 26 to be automatically wound up on the spool 320 (the roll core 320A).

Circular guide plates 432 and 434 are respectively secured to the portion of the bracket 418 between the pressure rollers 422 and 426 and the portion thereof between the pressure rollers 426 and 430 so as to guide the leading end portion of the photographic paper 24 or 26.

Since the bracket 418 is pivotally supported by the guide arm 388 through the pin 419, as the outer diameter of the roll of photographic paper 24 or 26 being wound up on the spool 320 increases as shown in FIG. 17, the pressure roller 426 separates from the outer periphery of the roll of photographic paper 24 or 26, and only the pressure rollers 422 and 430 are in contact with the outer periphery of the roll of photographic paper 24 or 26, thus enabling the photographic paper 24 or 26 to be stably retained.

An arm 436 projects from the shaft 414, and one end of a lever 440 is pivotally supported at the distal end portion of the arm 436 through a pin 438. The other end of the lever 440 is pivotally supported through a pin 442 at the distal end portion of an arm 444 which is secured to the shaft 390. Thus, the arm 436, the lever 440 and the arm 444 in combination constitute a quadric crank chain which enables the guide arms 388 and 386 to pivot about the shafts 390 and 414, respectively, in response to each other.

A tension coil spring 446 is interposed between the pin 438 and the guide arm 388, and a tension coil spring 448 between the pin 442 and the machine frame 28, so as to bias the guide arms 386 and 388 to move toward the outer periphery of the spool 320.

However, when the guide arms 386 and 388 are separated from the outer periphery of the spool 320 by a predetermined amount, the respective axes of the springs 446 and 448 are shifted from one side to the other side of the corresponding shafts 390 and 414, thereby inverting the direction of the biasing forces respectively applied to the guide arms 386 and 388.

Accordingly, when the operator turns the guide arms 386 and 388 by a predetermined amount, the guide arm 386 is turned in the dirction in which it moves toward the guide block 412 as shown in FIG. 18. Under this state, the bracket 418 mounted on the guide arm 388 abuts against a guide block 450 secured to the machine frame 28, thereby restricting the movement of the guide arm 388.

(Operation of the Embodiment)

FIGS. 1 and 2 show a state wherein the photographic paper 24 is unwound from the roll 24A loaded on the spool 20 so as to be subjected to printing in the printing section 14 and is then wound up into the take-up spool section 18. In this state, the lower electromagnetic clutch 138 is cut off, and the leading end portion of the photographic paper 26 is at rest at a position between the loading guide roller 86 and the light-shielding guide roller 92 as shown in FIG. 6. There is no risk of the photographic paper 26 being moved backwards despite the tension applied thereto by the dancer roller 38, since the loading guide roller 86 is prevented from reversing by the engagement between the one-way clutch 147 and the ratchet wheel 148 and that between the ratchet wheel 148 and the lever 150.

When the photographic paper 24 or 26 is loaded on the spool 20 or 22, the corresponding electromagnetic clutch 138 is cut off, and the leading end portion of the photographic paper 24 or 26 is passed over the corresponding guide and dancer rollers 36 and 38 and is then fed into the area between the corresponding loading guide rollers 86 and 88. Then, the guide roller 86 is rotated by using the associated knob 136 of that the leading end portion of the photographic paper 24 or 26 is clamped between the guide rollers 86 and 88. Since the one-way clutch 147 allows the shaft 102 to rotate in the direction of the arrow DR, the guide roller 86 can easily be rotated by turning the knob 136.

When the photographic paper 26 is loaded on the lower spool 22 and the width of the paper 26 is input to a controller (not shown), the controller drives the motor 80 on the basis of the input value so as to simultaneously move the flange 54 and the width-restricting guide rollers 106 and 108 shown in FIG. 7. More specifically, the rotation of the motor 80 turns the external thread 72, and the drive shaft 56 is thereby caused to move the disk 44 axially thereof, whereby the flange 54 is accurately moved to and stopped at the position corresponding to the lateral end of the loaded roll 26A of photographic paper 26. At the same time, the rotation of the motor 80 causes the movable blocks 118 to move toward or away from each other through the rotary shaft 124. In consequence, the width-restricting guide rollers 106 and 108 move the same distance, and the pair of flanges 110 stop at positions corresponding respectively to the lateral edges of the photographic paper 26.

When printing of the photographic paper 24 has been completed or needs to be suspended, the intermediate portion of the photographic paper 24 is cut by means of the cutter 169, and the front portion of the paper 24 thus cut is wound up into the take-up spool section 18 and is then taken out, while the rear portion of the paper 24 is retracted to a position between the light-shielding guide roller 90 and the loading guide roller 86. In this case, both the upper and lower electromagnetic clutches 138 are cut off, and the pawl portion at the distal end of the upper lever 150 shown in FIG. 5 is disengaged from the corresponding ratchet wheel 148. Under this set of conditions, the upper loading guide roller 86 is rotated clockwise as viewed in FIG. 6 by turning the upper knob 136 so that the leading end portion of the photographic paper 24 is at rest at a position between this loading guide roller 86 and the light-shielding guide roller 90. Then, the pawl portion of the lever 150 is re-engaged with the ratchet wheel 148, thereby preventing the reversing of the loading guide rollers 86. In place of turning the upper knob 136 by a manual operation, the motor 146 may be reversed with the upper electromagnetic clutch 138 alone engaged.

Subsequently, the controller starts the motor 200 shown in FIG. 11 so as to rotate the pulley 192, the rotary shaft 284 and the pulley 374 at the same time. In consequence, the guide clocks 176 and 178 shown in FIG. 10, the width-restricting guide rollers 266 and 268 shown in FIG. 13, and the flange 354 shown in FIG. 15 move by the same amount in the axial directions of their corresponding shafts so as to serve to restrict the lateral movement of the photographic paper 26.

The controller then causes only the lower electromagnetic clutch 138 shown in FIG. 7 to be engaged and starts the motor 146 to rotate in reverse, thus causing the lower loading guide roller 86 to rotate (in the direction of the arrow DR) in such a manner that the photographic paper 26 is passed through the area between the light-shielding guide rollers 90 and 92 and fed to the printing section 14. Since the lateral movement of the photographic paper 26 is restricted by the flange 54 and the width-restricting guide rollers 106 and 108, there is no risk of the paper 26 meandering or moving in a zigzag direction.

The leading end portion of the photographic paper 26 then reaches the rear guide section 16 where it passes through the grooves 186 of the opposing guide blocks 176 and 178 shown in FIG. 10, and while doing so, the lateral movement of the paper 26 is restricted. Thereafter, the photographic paper 26 passes through the area between the main drive roller 180 and the press rollers 182 and 184 shown in FIG. 9. In this state, the pivotal guide plate 220 is positioned horizontally as shown by the solid line in FIG. 9, so as to guide the leading end portion of the photographic paper 26 to the area between the guide rollers 222 and 224.

When the leading end portion of the photographic paper 26 has passed the main drive roller 180, the movement of the paper 26 and the printing section 14 is controlled by the rotational force of the roller 180. In this case, the force of the motor 146 in the front guide section 12 is cut off by disengaging the clutch 138, or the motor 146 is rotated so that the photographic paper 26 is fed at a speed slightly lower than that in the take-up spool section 180.

Thus, the lateral movement of the photographic paper 26 is restricted also in the rear guide section 16 by means of the guide blocks 176, 178 and the guide rollers 222, 224. There is therefore no risk of the paper 26 meandering or moving in a zigzag direction.

As shown in FIG. 9, when the leading end portion of the photographic paper 26 passes through the area between the guide rollers 222 and 224 and reaches the area between the lead-in roller 292 and the press roller 294, the leading end portion of the paper 26 is stopped at the area between the rollers 292 and 294. On the other hand, the main drive roller 180 feeds the intermediate portion of the photographic paper 26 synchronously with the printing operation carried out at the printing section 14, and the pivotal guide plate 220 is turned to the vertical position as shown by the imaginary line in FIG. 9.

In consequence, the intermediate portion of the photographic paper 26 is formed into the loop 226 between the guide roller 224 and the main drive roller 180. The length or size of the loop 226 is detected by the sensors 256 and 258. When the length of the loop 226 reaches an appropriate value, the motor 298 is started so as to rotate the lead-in roller 292. Accordingly, the rotation of each of the motors 298 and 212 is controlled in such a manner that the loop 226 has an appropriate length at all times.

The leading end portion of the photographic paper 26 fed out from the lead-in roller 292 is then fed to the take-up spool section 18, where an empty roll core 320A is loaded, and the guide arms 386 and 388 are positioned maximumly close to the outer periphery of the spool 320. Accordingly, the leading end portion of the photographic paper 26 fed out from the lead-in roller 292 reaches the area between the pressure roller 396 and the spool 320 while being guided by the guide plates 392 and 416. The leading end portion of the photographic paper 26 fed out by means of the pressure roller 396 moves along the outer periphery of the spool 320 while being pressed against the outer periphery of the spool 320 again by the pressure rollers 402 and 422, passes the pressure rollers 426 and 430 and reaches a position in the vicinity of the pressure roller 396. Thus, when the photographic paper 26 has been wound on the spool 320 one turn, the leading end portion of the paper 26 is clamped to the outer periphery of the roll core 320A by means of the intermediate portion of the paper 26 being fed thereonto, thereby allowing the photographic paper 26 to be automatically wound on the roll core 320A.

As the diameter of the roll of the photographic paper 26 wound up on the spool 320 increases, the guide arms 386 and 388 expand or separate from each other, so that the pressure rollers 396, 402, 422 and 430 serve to wind up the photographic paper 26 around the spool 320 is an appropriate state while retaining the outer periphery of the roll of photographic paper 26.

When the diameter of the roll of photographic paper 26 wound up on the spool 320 reaches a predetermined value, the printing operation is suspended, and the intermediate portion of the photographic paper 26 is cut by means of the cutter 169. Then, the guide arms 386 and 388 are turned maximumly as shown in FIG. 18 so as to retract beyond the outer periphery of the roll of photographic paper 26 wound up on the spool 320. It is therefore possible to unload the photographic paper 26 together with the roll core 320A from the spool 320 without any obstruction.

To resume the printing operation using the photographic paper 26, the leading end portion of the paper 26 cut by the cutter 169 as described above is fed by an operation similar to the above. When the printing using photographic paper 26 is stopped and the printing using photographic paper 24 is resumed, an operation similar to the above is also carried out.

It is to be noted that although the above-described embodiment exemplifies the arrangement wherein the restriction of the lateral movement of the photographic paper 24 or 26 when it is being fed is effected by the manual operation in which the operator inputs the width of the photographic paper to be used 24 or 26b to the controller, the arrrangement may be such that the width of the photographic paper to be used 24 or 26 is automatically detected, and the restriction of the lateral movement of the paper 24 or 26 is automatically effected on the basis of the detected width.

What is claimed is:

1. An apparatus for automatically winding up a photographic paper that has been photographically processed onto a take-up spool, comprising:
   a pair of guide plates disposed so as to face the obverse and reverse surfaces respectively of the photographic paper, for guiding the leading end portion of said paper to the outer periphery of said spool;
   a pair of guide arms to which said pair of guide plates are respectively secured and which expand or separate from each other in accordance with increase in the diameter of the roll of photographic paper being wound up onto said spool;
   rollers rotatably mounted on said pair of guide arms, respectively, so as to press said photographic paper on the outer periphery of said spool;
   a pivotal arm mounted on one rotary shaft with one of said rollers on one of said guide arms; and
   a bracket pivotably mounted on another rotary shaft, wherein one of said pair of guide plates has its edge portion extending as far as the vicinity of the roller mounted on one of said pair of guide arms, while the other guide plate has its edge portion extending as far as the vicinity of the roller mounted on the other guide arm, and wherein said pivotal arm and said bracket pivot in accordance with said increase in the diameter of the roll.

2. An apparatus according to claim 1, further comprising:

means for biasing said pair of guide arms in the direction in which they close or move toward each other.

3. An apparatus for automatically winding up a photographic paper that has been photographically processed onto a take-up spool, comprising:
a pair of guide plates disposed so as to face the obverse and reverse surfaces respectively of the photographic paper, for guiding the leading end portion of said paper to the outer periphery of said spool;
a pair of guide arms to which said pair of guide plates are respectively secured and which expand or separate from each other in accordance with increase in the diameter of the roll of photographic paper being wound up onto said spool;
a roll core concentrically mounted on said spool, said photographic paper being wound on said spool through said roll core;
rollers rotatably mounted on said pair of guide arms, respectively, so as to press said photographic paper on the outer periphery of said spool;
a pivotal arm mounted on one rotary shaft with one of said rollers on one of said guide arms; and
a bracket pivotably mounted on another rotary shaft,
wherein one of said pair of guide plates has its edge portion extending as far as the vicinity of the roller mounted on one of said pair of guide arms, while the other guide plate has its edge portion extending as far as the vicinity of the roller mounted on the other guide arm, and wherein said pivotal arm and said bracket pivot in accordance with said increase in the diameter of the roll.

4. An apparatus according to claim 3, further comprising:
means for biasing said pair of guide arms in the direction in which they close or move toward each other.

5. An apparatus for automatically winding up a photographic paper that has been photographically processed onto a take-up spool, comprising:
a first guide arm having a first guide plate at one end thereof and a first shaft at the other end thereof, said first guide plate having its edge portion extending as far as the outer peripheral portion of said spool, and said first guide arm being pivotal about said first shaft;
a first pressure roller rotatably mounted on said first guide arm and in the vicinity of the edge portion of said first guide plate;
a pivotal arm mounted on said first guide arm so as to be pivotal about a rotary shaft which rotatably supports said first pressure roller;
a second pressure roller rotatably mounted on said pivotal arm;
a first tension coil spring interposed between said first guide arm and said pivotal arm so as to press said second pressure roller against the outer peripheral portion of said take-up spool;
a second guide arm having a second guide plate at one end thereof and a second shaft at the other end thereof, said second guide plate being disposed in such a manner tha the photographic paper can pass thrqugh the area between said first and second guide plates, and said second guide plate having its edge portion extending as far as the vicinity of the outer peripheral portion of said take-up spool, and said second guide arm being adapted to be pivotal about said second shaft;
a bracket pivotally mounted on said second guide arm;
a third pressure roller rotatably mounted on said bracket on the side thereof which is closer to said second pressure roller;
a fourth pressure roller rotatably mounted on said bracket so as to be disposed between said take-up spool and said second guide plate; and
biasing means for pressing said first, third and fourth pressure rollers against the outer peripheral portion of said take-up spool.

6. An apparatus according to claim 5, further comprising:
a first arm having one end thereof secured to said first shaft;
a second arm having one end thereof secured to said second shaft; and
a lever connecting together the respective other ends of said first and second arms,
wherein said biasing means includes a second tension coil spring having one end thereof fixed and the other end retaining by the connecting portion between said first arm and said lever so as to press said first pressure roller against the outer peripheral portion of said take-up spool, and a third tension coil spring having one end thereof fixed and the other end retained by the connecting portion between said second arm and said lever so as to press said third and fourth pressure rollers against the outer peripheral portion of said take-up spool.

7. An apparatus according to claim 5, further comprising:
circular guide plates respectively secured to said pivotal arm and said bracket on the sides thereof which are closer to the outer peripheral portion of said take-up spool so as to guide the leading end portion of the photographic paper.

* * * * *